(12) United States Patent
Chen et al.

(10) Patent No.: US 11,346,805 B2
(45) Date of Patent: May 31, 2022

(54) HANDHELD ELECTROCHEMICAL SENSING PLATFORM

(71) Applicant: Colorado State University Research Foundation, Fort Collins, CO (US)

(72) Inventors: Thomas W. Chen, Fort Collins, CO (US); Lang Yang, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 521 days.

(21) Appl. No.: 15/891,101

(22) Filed: Feb. 7, 2018

(65) Prior Publication Data

US 2018/0224394 A1 Aug. 9, 2018

Related U.S. Application Data

(60) Provisional application No. 62/571,895, filed on Oct. 13, 2017, provisional application No. 62/455,878, filed on Feb. 7, 2017.

(51) Int. Cl.
*G01N 27/416* (2006.01)
*G01N 27/02* (2006.01)
(Continued)

(52) U.S. Cl.
CPC ......... *G01N 27/4163* (2013.01); *G01N 27/02* (2013.01); *G01N 27/416* (2013.01); *G01N 27/48* (2013.01); *G01N 27/49* (2013.01)

(58) Field of Classification Search
CPC .... G01N 27/02; G01N 27/028; G01N 27/416; G01N 27/4163; G01N 27/3273;
(Continued)

(56) References Cited

U.S. PATENT DOCUMENTS 9,933,387 B1 * 4/2018 McCanna .......... G01N 27/3273
2003/0178322 A1 9/2003 Yengar et al.
(Continued)

FOREIGN PATENT DOCUMENTS

EP 1099114 B1 11/2004

OTHER PUBLICATIONS

International Search Report and Written Opinion, PCT/US2018/017265, dated Apr. 13, 2018.
(Continued)

*Primary Examiner* — Gurpreet Kaur
(74) *Attorney, Agent, or Firm* — Polsinelli PC

(57) ABSTRACT

Aspects of the present disclosure involve systems, methods, and the like, for an electrochemical sensing platform for point-of-care diagnostic applications. The ES platform may include functionality for many types of ES applications, including but not limited to, voltammetry, galvanometry, amperometry, and electrochemical impedance spectroscopy (EIS). In some embodiments, the platform includes sensor analog front end, stimulus generation, analog sensor data acquisition and conditioning, digital-to-analog conversion, back-end digital signal processing, wired or wireless interface, and a user application for interacting with the platform. In some embodiments, the platform includes a number of functional modules to provide a low cost and high mobility to the device, while maintaining the performance specifications. Signal generation, digital data acquisition/processing may be managed by an on-board microcontroller or off-board computing device. Further, data results from the platform may be transmitted to one or more network devices.

19 Claims, 16 Drawing Sheets

(51) Int. Cl.
*G01N 27/49* (2006.01)
*G01N 27/48* (2006.01)

(58) Field of Classification Search
CPC ............ G01N 27/327; G01N 27/3271; G01N 27/3272; G01N 27/40; G06F 19/322; G06F 19/3418; G01R 27/00
See application file for complete search history.

(56) References Cited

U.S. PATENT DOCUMENTS

| | | |
|---|---|---|
| 2005/0210962 A1* | 9/2005 | Bohm ................ G01N 27/3271 73/53.01 |
| 2007/0179370 A1 | 8/2007 | Say et al. |
| 2008/0204233 A1* | 8/2008 | Agrawal ................ G06Q 10/08 340/572.1 |
| 2009/0166225 A1 | 7/2009 | Yengar et al. |
| 2010/0213080 A1 | 8/2010 | Celentano et al. |
| 2010/0305421 A1 | 12/2010 | Ow-Wing |
| 2011/0036714 A1 | 2/2011 | Zhou et al. |
| 2011/0320130 A1 | 12/2011 | Valdes et al. |
| 2012/0067742 A1* | 3/2012 | Lee .................... G01N 33/5438 205/782 |
| 2012/0215277 A1* | 8/2012 | Berg ................ A61B 5/04286 607/32 |
| 2013/0004949 A1 | 1/2013 | Rearick |
| 2013/0334041 A1* | 12/2013 | Kondo ................ G01N 27/327 204/403.01 |
| 2014/0148872 A1 | 5/2014 | Goldwasser |
| 2015/0004680 A1 | 1/2015 | Song et al. |
| 2016/0033440 A1* | 2/2016 | Cho ...................... G01N 33/49 205/782 |
| 2018/0031503 A1* | 2/2018 | Hidaka ............ G01N 33/48707 |

OTHER PUBLICATIONS

Wang et al. Real-time telemetry system for amperometric and potentiometric electrochemical sensors. Sensors 2011, 11, 8593-8610.

Yang et al. A compact signal generation and acquisition circuit for electrochemical impedance spectroscopy. In: 2016 IEEE Biomedical Circuits and Systems Conference (BioCAS), Oct. 19, 2016.

* cited by examiner

HANDHELD ELECTROCHEMICAL SENSING PLATFORM

CROSS-REFERENCE TO RELATED APPLICATIONS

This application is related to and claims priority under 35 U.S.C. § 119(e) from U.S. Patent Application No. 62/455,878, filed Feb. 7, 2017 titled "Multi-frequency Stimuli Generation For Electrochemical Impedance Spectroscopy" and from U.S. Patent Application No. 62/571,895, filed Oct. 13, 2017, titled "Multi-frequency Stimuli Generation For Electrochemical Impedance Spectroscopy," the entire content of both of which is incorporated herein by reference for all purposes.

TECHNICAL FIELD

Aspects of the present disclosure generally relate to systems and methods for electrochemical sensing of a medium, and more particularly, to systems and methods for a compact and/or modular Electrochemical Impedance Spectroscopy (EIS) data acquisition device for a variety of uses, including ubiquitous pathogen detection and disease diagnosis.

BACKGROUND

As the quality of life improves markedly over the last several decades, interests in low-cost and highly mobile methods for disease prevention have grown significantly. Early detection of virus and bacteria can help health care providers make decisions on effective treatments and prevent them from developing into serious diseases. Low-cost methods for pathogen detection in general are also highly desirable to make food and water safer for consumption. Traditional methods for pathogen detection, such as polymerase chain reaction (PCR), offer high specificity with low limits of detection. However, such methods often include the use of expensive equipment, such as a thermocycler, specialized regents, the need for fluorescent labeling, and laborious assay preparation steps. These disadvantages make such methods not suitable as a low-cost and highly-mobile platform for pathogen detection.

Electrochemical methods provide an alternative for pathogen detection. One of the key advantages of electrochemical methods is that the transduction modes are based on measurement of changes in electrical property, making them highly suitable for low-cost and miniaturization. One particular type of electrochemical sensing is electrochemical impedance spectroscopy (EIS) that analyzes complex impedance changes that illustrates changes in both double layer capacitance and electron transfer resistance. In general, EIS measures the impedance of a medium over a range of frequencies, and therefore the frequency response of the medium, including the energy storage and dissipation properties. When applied to a tissue sample, the spectrum curvature from EIS may provide a signature for what an abnormal cell looks like, such as a tumor cell or tissue. In this manner, EIS may be utilized as an effective pathogen detector, among other uses. Other types of electrochemical analysis may similarly provide needed pathogen detection.

Further, current electrochemical measurement instrumentation provides a wide-range of electrochemical analysis, such as voltammetry, galvanometry, and EIS at a variety of specifications. For example, different electrochemical analysis utilizes a wide-range of speed and noise performance to conduct the analysis, all typically included in a single box or device. However, such instruments may not be useful for all applications. For example, with all the functionality and performance specifications included in a single unit, the device may be large and bulky. Such devices are intended for use in the lab environment, not for mobile use, even though their form-factors have been reduced significantly. Also, all-in-one devices can be cost prohibitive for many users, running into the thousands of dollars. Such price points are not feasible for large-scale deployment of devices. Further, a typical use of electrochemical analysis devices may only uses 10-20% of the functionality and/or specification range, leaving the majority of the unit wasted or unused. The premise that a fully capable unit can be shared by a whole team in a lab environment is not very practical in reality, leading to limited use over time such that a lab often has to purchase more units than they intended.

It is with these observations in mind, among others, that various aspects of the present disclosure were conceived and developed.

SUMMARY

One implementation of the present disclosure may take the form an electrochemical sensing device. The device may include a base device and a sensor cartridge. The base device may include a base unit controller circuit, a stimulus signal generation portion comprising a stimulus signal generator circuit in communication with the base unit controller circuit generating a stimulus signal for conducting an electrochemical analysis of a sample, and a data acquisition portion comprising a response read channel receiving data results for the electrochemical analysis of the sample. In addition, the base device include one or more expansion interfaces receiving at least one expansion module comprising a module controller in communication with one or more components of the at least one expansion module to provide additional functionality to the base device. The sensor cartridge comprises at least one detection electrode and a microfluidic channel guiding the sample over the at least one detection electrode for the electrochemical analysis.

Another implementation of the present disclosure may take the form of a method for electrochemical analysis of a sample. The method may include the operations of connecting a computing device with a base unit, the base unit comprising a stimulus signal generation portion generating a stimulus signal for conducting the electrochemical analysis of a sample, a data acquisition portion comprising a read channel circuit, and one or more expansion interfaces receiving at least one expansion module comprising a module controller in communication with one or more components of the at least one expansion module to provide additional functionality to the base unit and mating a sensor cartridge with the base unit, the sensor cartridge comprising at least one detection electrode and a microfluidic channel guiding the sample over the at least one detection electrode for the electrochemical analysis. Further, the method may include transmitting the stimulus signal for conducting the electrochemical analysis of the sample to the at least one detection electrode of the sensor cartridge in response to a testing input received at the computing device from a user interface and receiving electrochemical results data for the electrochemical analysis of the sample from the sensor cartridge through the read channel circuit of the base unit.

In one aspect, the at least one expansion module is a quad-channel module comprising a quad-channel bi-directional communication circuit and a plurality of independent read channel circuits in communication with the quad-channel bi-directional communication circuit.

In one aspect, the at least one expansion module is a high-compliance voltage module comprising a high-compliance voltage generator circuit providing a higher compliance voltage to the base device than an operating compliance voltage of the base device.

In one aspect, the at least one expansion module is a high-speed module comprising a high-speed stimulus signal generator circuit, a high-speed read channel circuit, and a high-speed analog-to-digital convertor circuit.

In one aspect, the at least one expansion module is a low-noise module comprising a low-noise read channel circuit, a low-noise analog-to-digital convertor circuit, and a noise reduction circuit.

In one aspect, the at least one expansion module is a galvanostat module comprising a galvanostat read channel circuit and a galvanostat stimulus signal generator circuit.

In one aspect, the present disclosure includes a signal generation and acquisition circuit for electrochemical experiments.

In one aspect, the present disclosure includes a signal generation and acquisition circuit for electrochemical impedance spectroscopy (EIS).

In one aspect, the present disclosure includes a signal generation and acquisition circuit for AC voltammetry experiments.

In one aspect, the present disclosure includes a signal generation and acquisition circuit for non-faradaic sensing, for example capacitive sensors with spectrum output.

In one aspect, the present disclosure generates a composite signal comprised of two or more sinusoidal signals of varying frequency. In some embodiments, a unique phase offset is applied to each of the sinusoidal signals in order to reduce the peak-to-peak magnitude of the composite signal (i.e., to create a low crest factor signal).

In one aspect, the present disclosure generates a composite signal comprised of two or more non-sinusoidal signals of varying frequency. In some embodiments, a unique phase offset is applied to each of the non-sinusoidal signals in order to reduce the peak-to-peak magnitude of the composite signal (i.e., to create a low crest factor signal).

In one aspect, the present disclosure generates a composite signal comprised of combination of signals, one or more sinusoidal and one or more non-sinusoidal, of varying frequency. In some embodiments, a unique phase offset is applied to each of the signals in order to reduce the peak-to-peak magnitude of the composite signal (i.e., to create a low crest factor signal).

DETAILED DESCRIPTION

Aspects of the present disclosure involve systems, methods, computer program products, and the like, for an electrochemical sensing (ES) platform for point-of-care diagnostic applications. The ES platform may include functionality for many types of ES applications, including but not limited to, voltammetry, galvanometry, amperometry, and electrochemical impedance spectroscopy (EIS). In some embodiments, the platform includes sensor analog front end, stimulus generation, analog sensor data acquisition and conditioning, digital-to-analog conversion, back-end digital signal processing, wired or wireless interface, and a user application for interacting with the platform. Signal generation, digital data acquisition/processing may be managed by an on-board microcontroller or off-board computing device. Automatic gain control and noise reduction filter techniques may be applied to adjust the signal-to-noise ratio of a generated stimulus signal. Such a signal may be an aggregate analog signal of several superposition sinusoidal signals in time domain to provide a frequency spread signal for use during ES analysis. Further, data results from the platform may be transmitted to one or more network devices. The network devices may receive such data results from multiple platforms and correlate, combine, and/or analyze the received data for a broad-based data analysis of a geographic region.

In one particular embodiment, the ES platform may include functionality and components for a particular type of ES analysis. For example, the system may include components for EIS applications. In other embodiments, the ES platform may be modularized to provide a platform for various ES applications based on a need by the user. Thus, the ES platform may include a base unit with several expandable modules. The base unit is configured to provide a basic functionality for ES sensing, such as voltammetry, amperometry, and EIS, that operates at a speed and noise-tolerance specification that reduces the overall cost of the base unit. In addition, the base unit may include one or more expansion slots that provide an interface with additional components for additional types of ES techniques. For example, one or more components may be inserted into the expansion slots that provide for galvanometry functionality of the ES device. This modular capability of the ES system allows a user to customize the system to the user's need, thereby reducing the overall cost of the device while allowing the device to be both customizable and portable.

Figure 1:
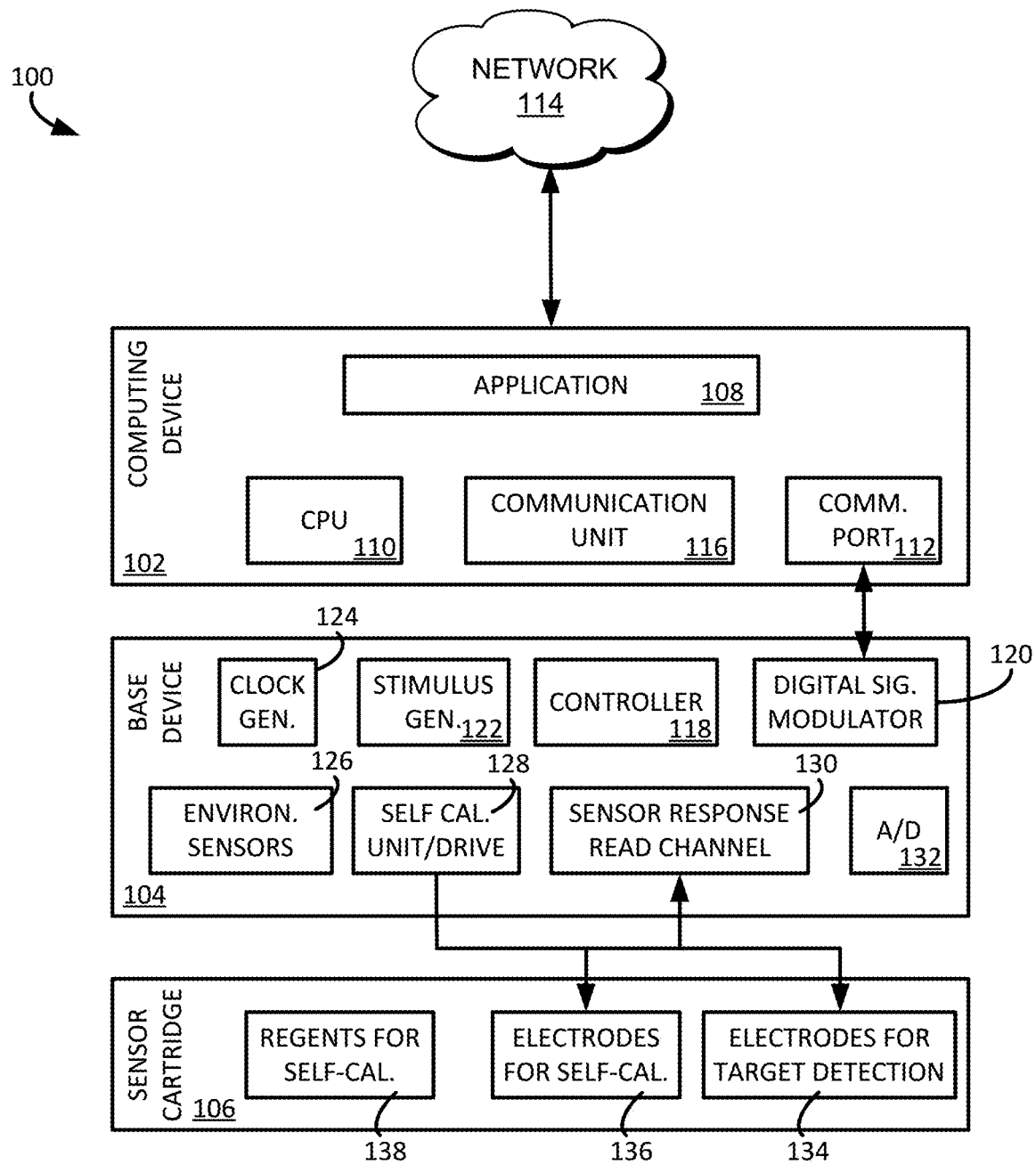
FIG. 1 is a schematic diagram illustrating a system 100 for a compact, low-power electrochemical sensing (ES) device, including a computing device, a base device, and a sensor cartridge.

FIG. 1 is a schematic diagram illustrating a system 100 for a compact, low-power electrochemical sensing device. In general, the system 100 includes three portions, a computing device (such as a smart phone or other handheld computing device) executing a controller program or application 108, a signal generation and acquisition device 104 (referred to herein as a "base device"), and a sensor cartridge 106. The three components are utilized as a system 100 to provide a low-cost and portable ES measurement device that may be used to for ubiquitous pathogen detection and disease diagnosis. In other words, a user may carry the system 100 for use in the field for disease diagnosis and detection where such portability was not possible before. Further, as explained in more detail below, the system 100 may include some modularity features to provide for additional ES features.

The system 100 includes a computing device 102 or other processing system. In one particular embodiment, the computing device 102 may be a smart phone, tablet, personal assistant, laptop, or other portable computing device. The computing device (described in more detail below) may include a central processor 110 for executing an application 108. The application 108, in general, controls the base device 104 through the transmission of one or more instructions to the base device. Such transmission of instructions may occur over a wired connection (such as through an audio jack or USB connector) or over a wireless connection. Regardless of the type of communication, the computing device 102 may include a communication port 112 to transfer/receive communications from the base device 104. In the embodiment where an audio jack or other wired connection is used, an audio processing unit 116 may be included to receive and process the information and data from the base device 104. In addition, the base device 104 may provide measurements or other information to the computing device 102 through the communication port 112.

Through the same or a different communication port, the computing device 102 may also communicate with one or more devices in a network 114. For example, one or more application servers or other type of servers may be included in a telecommunications network 114. As explained in more detail below, such servers may receive information from the computing device 102 corresponding to the measurements received from the base device 104 and/or analysis of such measurements. The servers may further receive diagnosis information from any number of diagnostic systems 100 to correlate and analyze over a large area or number of potential patients. Such information may be particularly useful in tracking and identifying the spread of a disease through a population or area.

As mentioned above, the base device 104 performs electrochemical sensing signal generation and data acquisition. In general, the base device 104 may include particular components to generate an ES stimulus signal and obtain data results from the application of the signal to the sample. It should be appreciated that the base device 104 illustrated in FIG. 1 is but one example of the components included in the base device. As discussed, the base device 104 may be modular in some embodiments to include more or fewer components for particular ES testing. The modules may thus be inserted into the base device 104 to add particular components to the base device for the added ES features. The particular embodiment illustrated in FIG. 1 may be utilized for electrochemical impedance sensing (EIS). Some or all of the components illustrated in the base device 104 of FIG. 1 may also be included in other, customized devices. Explanation of the particulars of the components may thus also apply to other embodiments of the ES system 100. The base unit 104 components for other types of ES techniques are discussed in more detail below.

In the embodiment shown, the base device 104 includes a microcontroller 118 for overall control of the components of the base device 104, receiving and executing instructions from the computing device 102 and transmitting data or information to the computing device. To conduct the ES measurement of a system, the microcontroller 118 provides at least one instruction to the signal generator 122 to construct the signal to be applied during the data acquisition. A clock signal generator 124 may also be included for use in generating the multi-frequency signal from the signal generator 122. One or more environmental sensors 126 may also be included to determine environmental conditions (such as temperature and humidity) for calibration and target detection, performed by the self-calibration unit/drive 128. Through the signal generator 122 and the self-calibration unit 128, the stimulus signal is applied to a medium for measurements and acquisition.

In addition, to receive the results of the measurements, the microcontroller 118 may be in communication with a sensor response read channel circuit 130 that receives and amplifies response current from sensor electrodes during calibration, target detection, and application of the stimulus signal to the medium under test. The sensor response read channel circuit 130 provides the amplified, and sometimes filtered for lower noise, response to the A/D converter 132 for conversion into a digital signal. For example, the read channel circuit 130 may convert a current signal into a voltage signal and amplify the voltage signal during conversion. Filtering for lower noise may be an add-on feature for low-noise applications, as described in more detail below. The digital signal modulator 120 receives the converted response signal and transmits the signal to the computing device 102. In this manner, the base device 104 generates the signal and acquires the data from an ES procedure performed on a sample. A more detailed explanation of some of the components of the particular base device 104 of FIG. 1 is included below with reference to FIG. 2.

The self-calibration unit 128 and sensor response read channel 130 are in communication with the sensor cartridge 106. In general, the sensor cartridge is a disposable unit that attaches or otherwise is in communication with the base device 104. The sensor cartridge 106 may include electrodes for target detection 134, electrodes for self-calibration 136 and reagents for self-calibration 138. The types of components of the sensor cartridge 106 may be specific for a particular type of medium on which the ES measurement is performed. The interaction and connection of the sensor cartridge 134 and the base device 104 is discussed in more detail below.

Many advantages are gained through the use of the system 100 of FIG. 1 over known ES measuring systems. For example, the device is generally of lower cost and consumes lower power than a traditional ES system. Further, the system 100 of FIG. 1 is portable, easy-to-use, and provides a high level of sensitivity. For example, the system 100 with pathogen-specific antigens immobilized on the sensor can detect impedance changes of less than 50 molecules of analyte per µL volume without enzymatic amplification. The system 100 also provides a short sample-to-result time and, as explained in more detail below, can connect to a network for cloud-based data analysis for region-based epidemiology analysis and for early warning of potential disease outbreaks.

Figure 2:
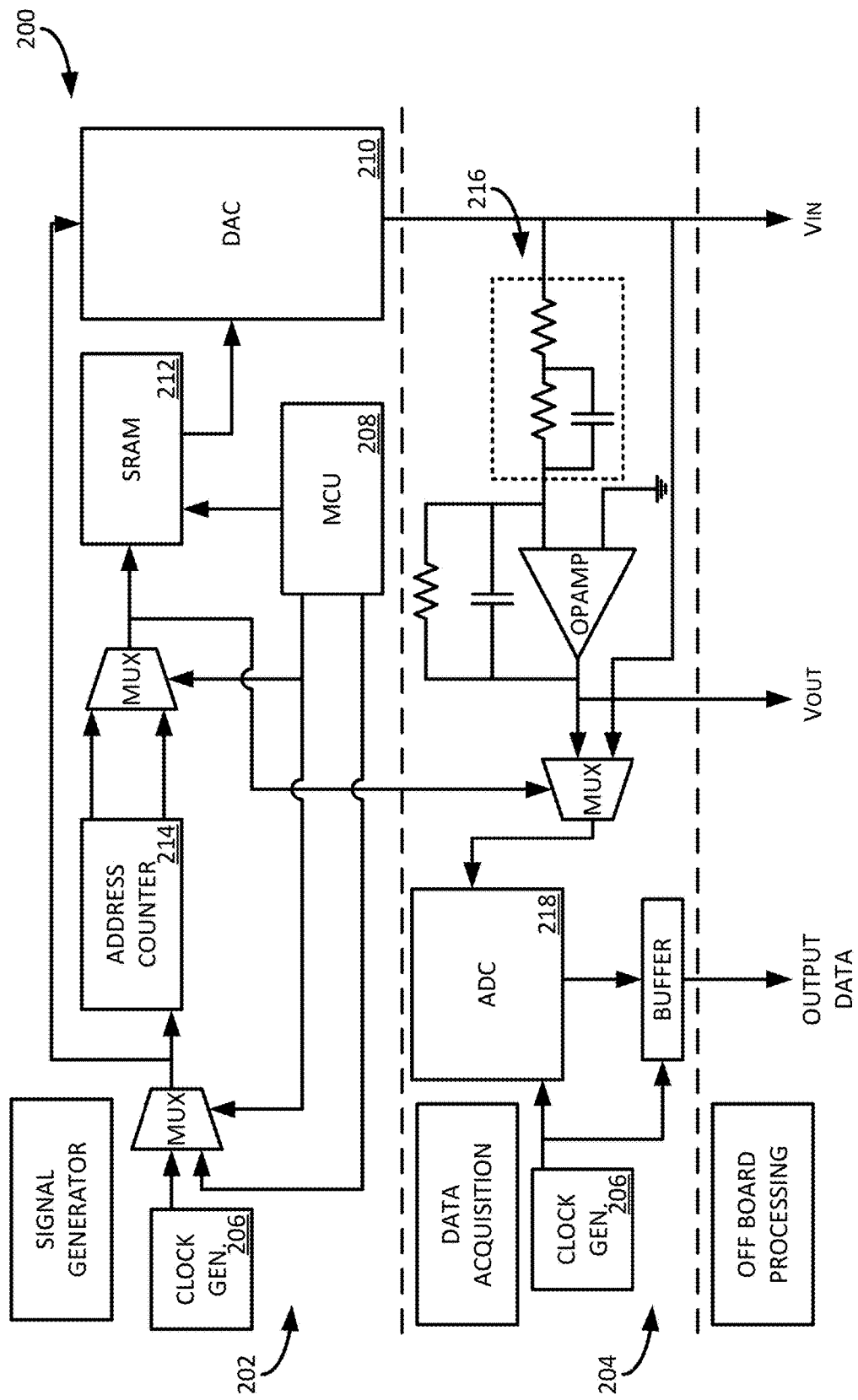
FIG. 2 is a circuit diagram of one particular embodiment of components of the base device of the electrochemical sensing system of FIG. 1.

FIG. 2 is a circuit diagram of one particular embodiment of the components of the ES base 104 of the system 100 of FIG. 1. As shown in FIG. 2, the ES base 104 may be constructed in two portions, a signal generator circuit 202 and a data acquisition circuit 204. It should be appreciated, however, that more components may be included in the ES base 104 of FIG. 1. Rather, the circuit 104 of FIG. 2 is provided to illustrate one particular embodiment of the ES base device that may be used for EIS techniques on a sample. Although further discussion of the base unit 200 refer to EIS techniques on a sample, the explanation of the components may also apply to other types of ES testing, such as voltammetry and amperometry, among others. Further, in some implementations, one or more of the components of the ES base device 104 may be embodied or included in the computing device 102 and/or the sensor cartridge 106 of the system 100. Further still and as explained in more detail below, some components of the base unit 104 may be supplemented, enhanced, or replaced through one or more modular or additional components connected to the circuit of FIG. 2. Such modular components may be added to the circuit 104 to provide additional functionality to the base unit to perform varying types of ES measurements.

Beginning with the signal generation portion 202 of the base circuit 104, a clock generator circuit 206 and a microcontroller unit (MCU) 208 are included. Additional components of the signal generation portion 202 may include an address counter 214, a memory device 212 (illustrated as a static random access memory (SRAM) device), a digital-to-analog (DAC) converter 210, and one or more multiplexers. The components of the signal generation portion 202 of the base circuit 104 operate to generate and provide a stimulus signal to a sample for EIS testing of the sample through the system 100 of FIG. 1.

In one particular example, the stimulus signal generator 202 combines 32 sinusoidal signals into a composite analog signal. To reduce the peak-to-peak magnitude of the combined signal, a low crest factor signal may be included by inserting phase offset to each individual sinusoidal signal frequency. The signal may be digitized discretely by 256 points for each cycle through the question:

$$x(t) = \sum_{i=1}^{n=32} A\sin(i\omega t + \varphi_i) \quad (1)$$

In operation, the MCU 208 is utilized to initialize the SRAM 212 with digital samples of the composite signal. Each composite, in one embodiment, may include 256 data points. The SRAM 212 is driven by the address counter 214 to select composite signal values in an incremental fashion. The multiplexers control the selection of two different frequency bands. For example, the circuit 202 may be configured to generate a stimulus signal consisting of 32 frequencies with a 2 Hz (low band) and a 62 Hz (medium band) step from 2 Hz to 32 kHz. The multiplexers thus select between these two operational bands.

The digital values of the composite signal from the SRAM 212 are converted into their analog counterparts by the DAC 210 before being applied to a sensor for impedance or EIS measurement. In one particular embodiment, the DAC 210 is a 12-bit DAC. The clock generator circuit 206 synchronizes the composite signal generation process. The output signal from the DAC 210 is then provided to the data acquisition portion 206 as an input signal to the sample of EIS measurement.

The data acquisition portion 206 of the base unit 204 is generally utilized to apply the generated stimulus signal to a sample and obtain the EIS measurements. These measurements may be transmitted to or otherwise provided to a computing device in communication with the base device 204 or to any other processing or analysis device. In the embodiment illustrated in FIG. 2, the data acquisition portion 206 includes a clock generator circuit (perhaps the same clock generator circuit 206 discussed above in relation to the signal generator portion 202), an analog-to-direct converter (ADC) 218, and a transimpedance amplifier (TIA) circuit 216 for converting the response current to an output voltage. In one implementation, the TIA circuit 216 may include and utilize an operational amplifier with a reference resistor $R_{REF}$ in the feedback path. A capacitor, $C_f$, in parallel with the $R_{REF}$ is used for reducing the TIA circuit's output noise. The values of $R_{REF}$ and $C_f$ may be selected to reduce output railing within the estimated range of $Z_{SENSOR}$ the TIA's bandwidth and noise tradeoff characteristic. In one particular design, a 1.91 kOhm resistor and a 470 pF feedback capacitor is chosen. In other embodiments, the resistor $R_{REF}$ may be replaced with a bank of resistor devices and an auxiliary circuit to determine whether the output voltage is railing. The auxiliary circuit may then determine which resistor in the bank of resistors to be utilized in the TIA circuit 216.

The output of the TIA circuit 216 may be provided to the ADC 218 to digitize the results. In one particular implementation, the ADC 218 may be a 12-bit converter. The output of the ADC 218 is then provided to the microcontroller 208 of the signal generator portion 202 of the circuit 204. In other embodiments, the output of the ADC 218 may be provided to any processing unit for analysis of the gathered data and information.

In one particular implementation, the close-loop gain of the TIA 216 may be controlled by a potentiometer. An array of filtering capacitors in parallel with the potentiometer may be multiplexed to reduce noise while maintaining the desired phase shift or signal attenuation. The data is sampled at the output of the TIA 216 through two ADC circuits in the MCU 208. Based on the ADC feedback to the MCU, the potentiometer and multiplexer for the capacitors can be automatically adjusted to maintain the TIA's output swing.

Regardless of the implementation, the sensor response from the data acquisition portion 206 is digitized by the ADC 218. This digitized data or information may be sent to a computing device for processing, such as computing device 102 of FIG. 1. The data processing may include calculating magnitude and phase information about the sensor impedance. Overall, two steps are taken to measure sensor impedance: (1) select and sample the input and output channel separately through the output multiplexer and convert them into digital outputs and 2) acquire digital outputs and execute fast Fourier transform (FFT) processing on the digitized signals, thereby calculating impedance for both magnitude and phase of the output signal. In embodiments with the microcontroller 208 performing the data processing, the impedance and phase data may then be transmitted to the computing device 202 of the system 200, either through a wired or wireless communication connection.

The examples provided above utilize two different frequency bands controlled by a multiplexer between the address counter 214 and the SRAM 212 in response to hardware constraints imposed by the size of the SRAM. Other embodiments may utilize composite signals with fewer data points, a larger SRAM, or other techniques to select composite signal values in incremental fashion without using multiple bands and a multiplexer (or alternatively, other designs may utilize more frequency bands in instances with a smaller SRAM or the composite signal included more data points).

Through the base circuit 200, two types of impedance sensing may be performed: faradaic and non-faradaic. Impedance sensing in the faradaic mode measures the charge transfer resistance in the sample as a function of the amount of molecular binding at the electrode surface. Impedance sensing in the non-faradaic mode measures changes in capacitance between a pair of electrodes to indicate molecular binding at the electrode surface. For impedance sensing in the faradaic mode, the base circuit 200 provides a low-cost and accurate sensor module that can obtain sensor impedance over the 0.5 Hz to 20 kHz range with less than 2.4% measurement error.

Figure 3:
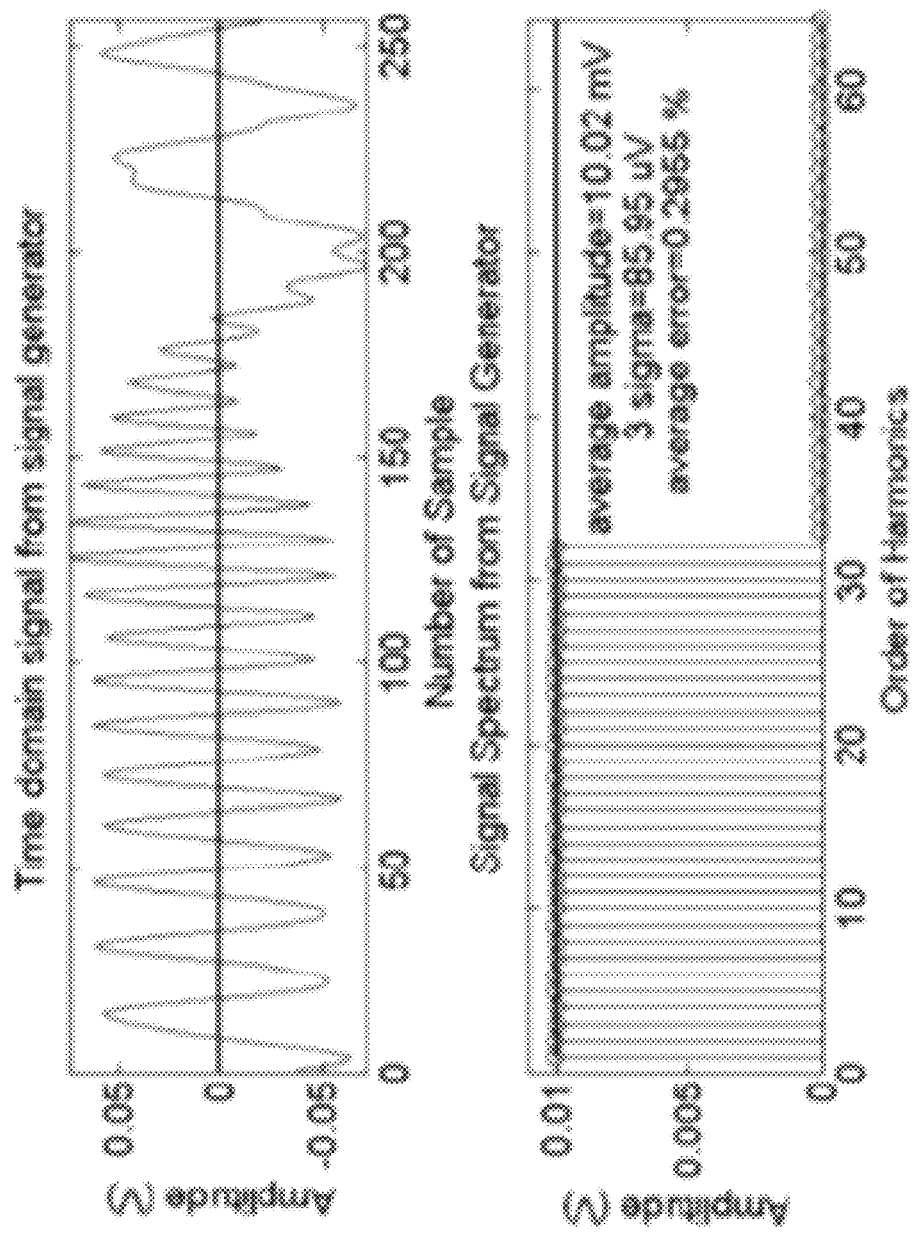
FIG. 3 illustrates an example output signal from the signal generator portion of the base circuit applied to a sample for ES analysis.

The traditional network analysis approach to EIS measurements applies sinusoidal stimuli by sweeping over a range of frequencies. However, sweeping of low-frequency signals is subject to increased flicker noise in the system, making the traditional network analyzer less effective for EIS in some instances. In contrast, stimuli generation in the base circuit 200 utilizes a composite analog signal containing multiple frequency components of a desired range to achieve a single application of stimuli rather than multiple stimuli swept over a desired frequency range. FIG. 3 illustrates such an example composite output signal from the signal generator 202 portion of the base circuit 200. The example illustrates a composite signal in the frequency range of 0.5 Hz to 2 kHz for a faradaic sensing mode with 0.3% error compared to an ideally desired flat spectrum of all the sinusoids in the given frequency range. In the example shown, the average amplitude for each frequency component is about 10.02 mV with a standard deviation of 28.65 pV.

Figure 4:
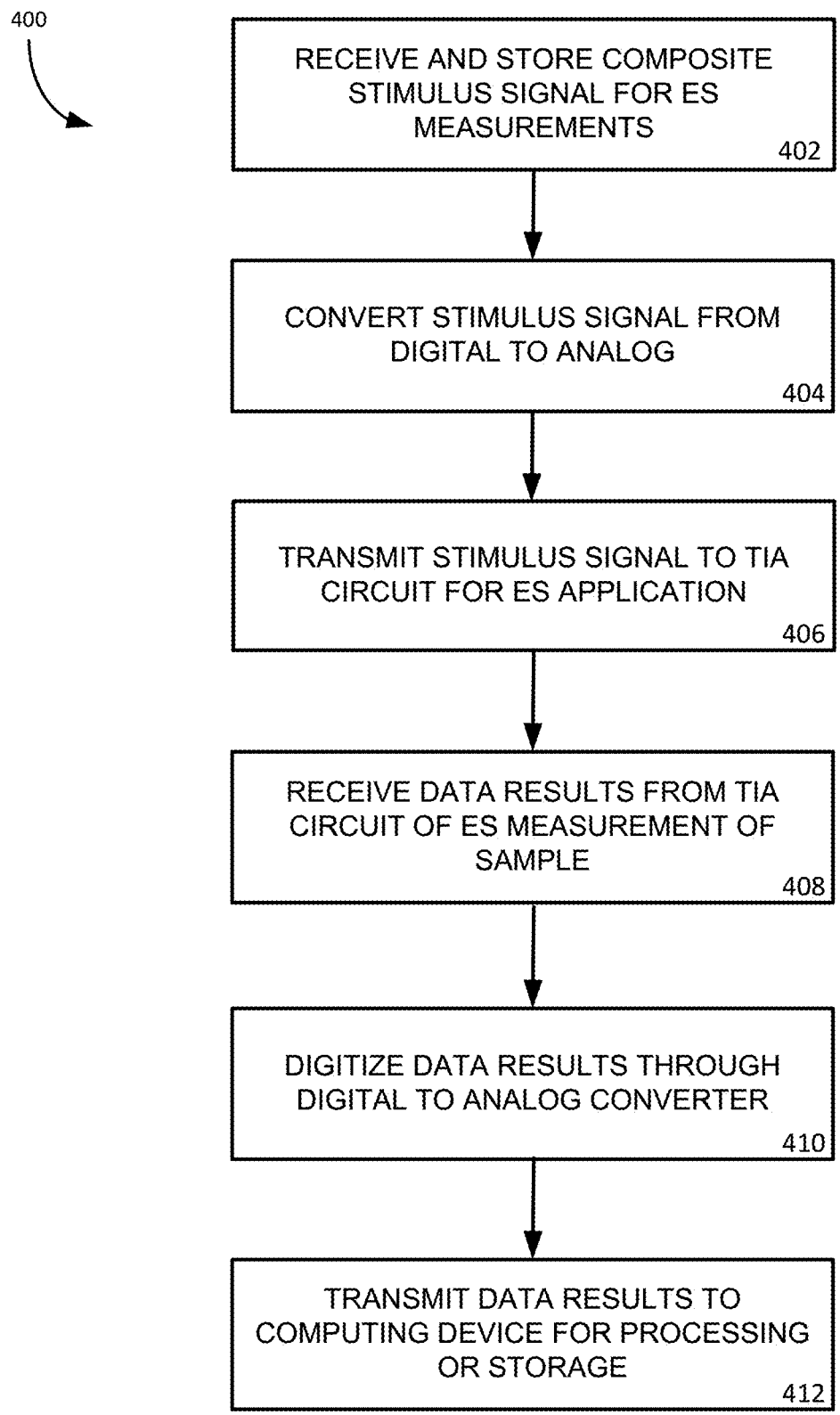
FIG. 4 illustrates a flowchart of a method of operation of the base device to conduct ES measurements on a sample utilizing the circuit of FIG. 2.

FIG. 4 illustrates a flowchart of a method 400 of the operation of the base device 200 of the ES system 100 to conduct ES measurements on a sample utilizing the circuit of FIG. 2. In one implementation, one or more of the operations of the method 400 may be performed by the MCU 208 to conduct the ES measurements of the sample. In other implementations, one or more of the operations of the method 400 may be performed by other components of the base device 106. In general, however, any component of the circuit 100 of the handheld ES device may perform one or more of the operations of the method 400.

Beginning in operation 402, the circuit 206 may receive and store the composite stimulus signal. In one particular example, the stimulus signal may include a composite of 32 frequencies with a 2 Hz (low band) and a 62 Hz (medium band) step from 2 Hz to 32 kHz, although any type of stimulus signal may be used. The digitized signal is received at the ES device 100 and stored in the SRAM 212. In operation 404 and during data acquisition, the digitized composite stimulation signal may be converted into an analog signal and, in operation 406, transmitted to the TIA circuit 216 of the base unit 104 for ES analysis of a sample.

In operation 408, the data results from the TIA are received during the ES measurement procedure. The data results may then be digitized through application of the analog-to-direct converter of the ES circuit 100. Upon digitation, the data results are transmitted to a computing device 102 for processing and/or storage. In some embodiments, the results may be provided to a network device for correlation with data acquisitions from other similar devices.

Figure 5:
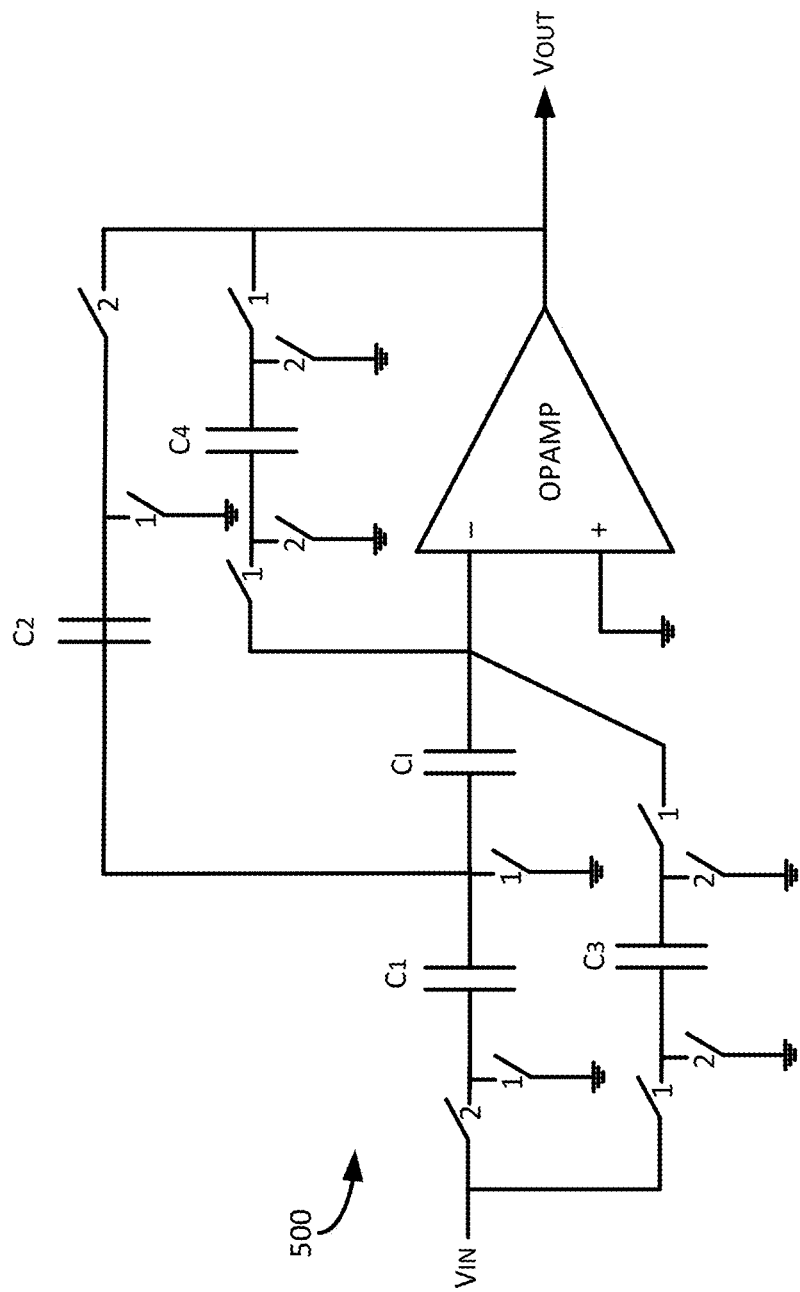
FIG. 5 illustrates a correlated double sampling circuit that may be utilized in the base circuit of the ES system for further low-frequency noise reduction.

Due to the flexibility of digital manipulations to generate the composite signal, the signal generation circuit allows for integration of noise-reduction techniques, such as correlated double sampling to reduce the impact of flicker noise at the low frequency range to improve sensitivity and measurement accuracy. In particular, FIG. 5 illustrates a correlated double sampling circuit that may be utilized in the base circuit 200 in place of the previously described TIA circuit 216. For practical electrochemical sensing applications, the flicker noise at the lower end of the frequency spectrum may be reduced to achieve a higher signal-to-noise (SNR) ratio. One effective approach to reduce flicker noise is through the inclusion of a correlated double sampling circuit 500, such as that shown in FIG. 5. Other techniques or circuits may also be implemented in the base unit 200 to further reduce noise in the stimulus signal at low frequencies.

Similar to the TIA circuit 216 described above, the correlated doubling sampling circuit 500 includes an operational amplifier 502 with a feedback loop that includes one or more capacitors. For example, the circuit 500 includes a first feedback loop with capacitor $C_4$ and another feedback loop with capacitor $C_2$. In general, the values of the capacitors of the circuit 500 illustrated in FIG. 5 depends upon the clock speed (i.e., the clock signal provided by the clock generator 206 of base circuit 200) and the desired noise reduction of the stimulus signal. In addition to several capacitors, the circuit 500 also includes two switches (labeled "1" and "2" in the circuit diagram 500) that correspond to two non-overlapping phases of the clock signal, respectively. Thus, the MCU 208 may provide one or more control signals to switch 1 and switch 2 to activate (or close) and deactivate (or open) the switches corresponding to the phases of the clock signal. The input signal to the circuit 500, labeled $V_{IN}$, is the same input to the TIA 216 illustrated above with reference to FIG. 2. As such, the $V_{IN}$ signal is the stimulus signal generated by the signal generator portion 202 of the circuit. $V_{OUT}$ of the circuit 500 is the data signal that is acquired by the base circuit 200, as described above.

A traditional approach for implementing a correlating double sampling circuit is to increase the clock signal rate to provide sufficient correlated sampling periods within the same time period. However, such an approach increases the overall power consumption of the circuit while additional switching circuits may be needed to temporally store the correlated samples within the TIA before the low frequency noise can be cancelled. Alternatively, the double correlated sampling circuit 500 of FIG. 5 takes advantage of the digital arbitrary function generator by sending a blank signal and a normal signal in two consecutive clock cycles. The TIA 500 receives and amplifies the two signals and provides them as the output of the circuit. Low frequency noise cancellation may be performed on the output signal by subtracting the observed noise in the blank signal cycle from the output signal in the normal signal cycle, thereby cancelling the accumulated flicker noise in the entire signal chain from the signal generator 202 at the output of the TIA circuit 216.

Figure 6:
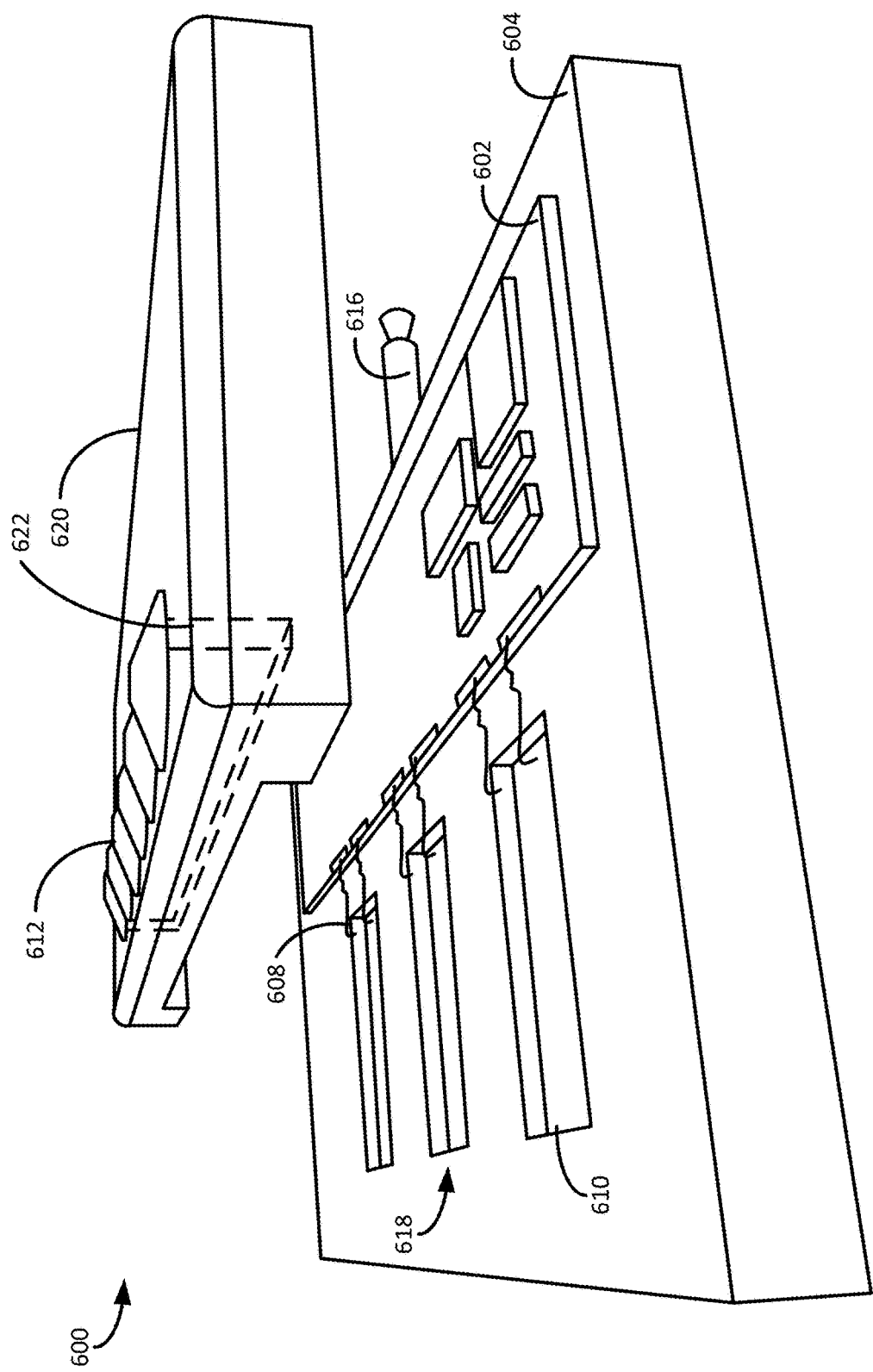
FIG. 6 is an exploded, perspective view of the base unit of the ES sensing device illustrating one or more components of the base unit.
Figure 7:
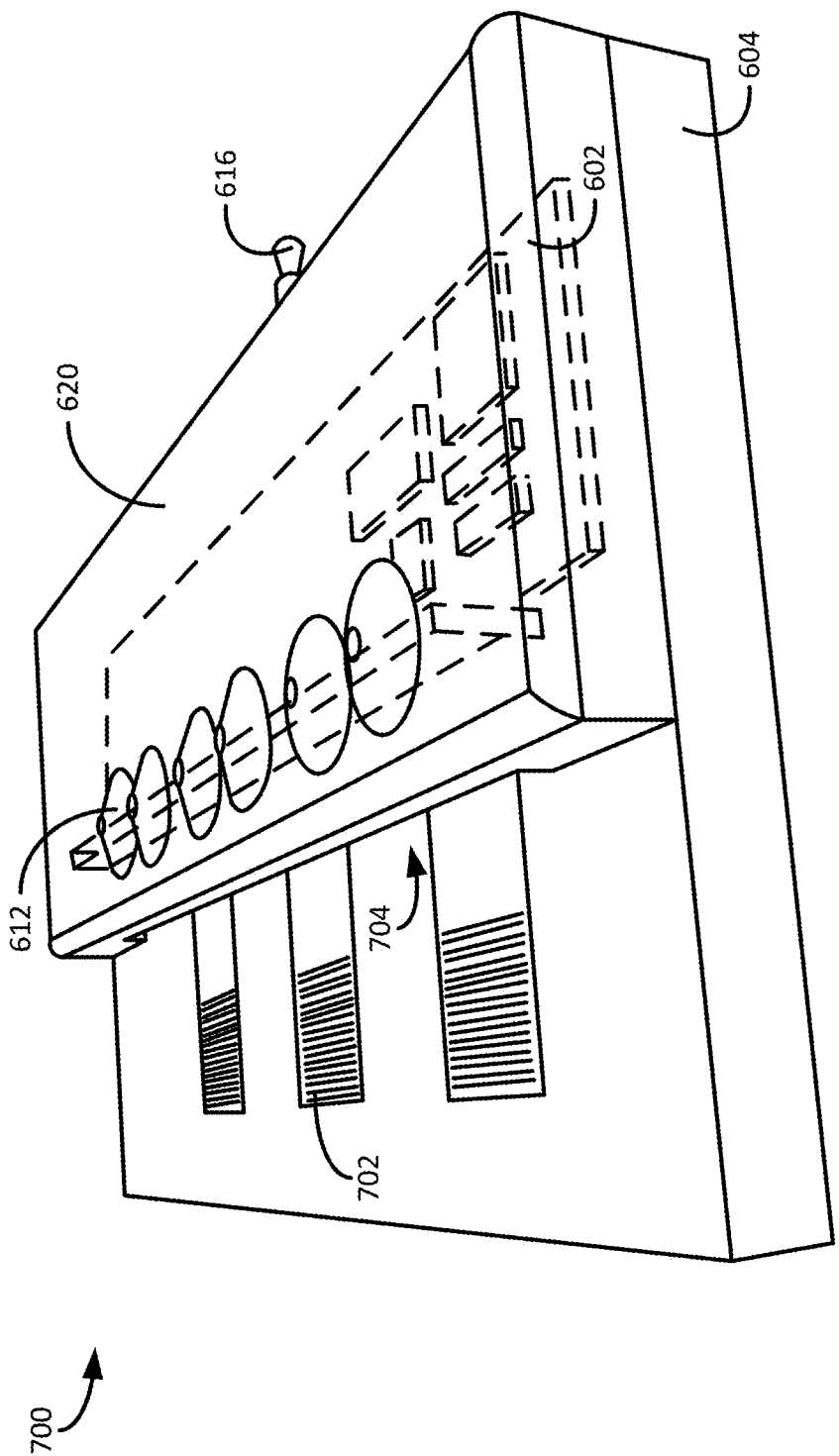
FIG. 7 is a perspective view of the base unit of the ES sensing device illustrating the connection of a top portion of the base unit and a bottom portion of the base unit.

Returning to FIG. 1, the base unit 104 generally provides an interface between the sensor cartridge 106 and the computing device 102 while controlling the ES technique conducted on the sample of the cartridge. FIGS. 6 and 7 are exploded, perspective views of the base unit 104 of the ES device 100 illustrating one or more components of the base unit. In general, the base unit 600 may include an electrochemical sensing and processing circuit board 602, signal transmission interface circuits (either wired 616 or a wireless transmitter (not shown) including the sensing and processing circuits in the electrochemical sensing and processing circuit board) for communicating with the computing device 102 of the sensing device 100, and electrode connection interface 618 with sensor electrode chips for interfacing with a disposable cartridge 106. The operation and use of the ES device 100 is described throughout with reference to FIGS. 6-8.

As mentioned, the base unit 600 may include a electrochemical sensing and processing circuit board 602, mounted on a support structure or bottom portion 604. The electrochemical sensing and processing board 602 may include some or all of the components of the base unit 104 discussed above with reference to FIGS. 1 and 2. For example, the MCU 118, A/D converter 132, the stimulus signal generator 122, and the like may be included and mounted on the electrochemical sensing and processing circuit board 602. One or more connectors 608 are in electrical communication with the electrochemical sensing and processing board 602 for conducting ES measurements. Three electrode chip positions 610 are illustrated in FIG. 6, with functionalized electrode chips being illustrated in those positions in FIG. 7. The bottom layer 604 of the base unit 600 includes the electrochemical sensing and processing board 602 mounted on the base, housing structures for electrode chips 610, and a communication port 616 for communicating with a computing device, such as a smart phone. In the embodiment shown in FIGS. 6 and 7, the unit 600 includes a head phone jack. It should be appreciated, however, that any communication mechanism for transmitting information to a computing device 102 may be utilized and embodied on the bottom layer 604 of the base unit 600, including wireless communications and other communication jacks or interfaces.

In one embodiment, the connectors 608 between the electrodes and the electrochemical sensing and processing board 602 may be adjustable to adapt the base unit 600 to communicate with various ES measuring devices. In particular, the upper layer 620 of the base unit 600 may include one or more universal sensor electrode position adjusters 612 that may be manipulated or controlled by a user of the base unit 600 to adjust the connectors 608. An open channel 622 extends through the upper portion 620 from the universal sensor electrode position adjusters 612 to the sliding connectors 608 for adjustment of the position of the connectors by a base unit user.

Turning now to FIG. 7, a fully assembled base unit 700 is illustrated. In general, the components of the base unit 700 are similar or the same as the base unit illustrated in FIG. 6. In addition to those components discussed above, the fully assembled unit 700 includes the functionalized electrode chips inserted in the electrode chip positions 610 discussed above. An opening 704 is included in the upper layer 620 to provide space to mount the functionalized electrode chips 702 in the electrode chip positions 610. The functionalized electrode chips 702 may be particular to a type of ES measurement or intended sample. FIG. 7 also illustrates the top layer 620 mounted on the lower layer 604 of the base unit 700 to protect the electrochemical sensing and processing board 602 from damage and environmental conditions.

Figure 8:
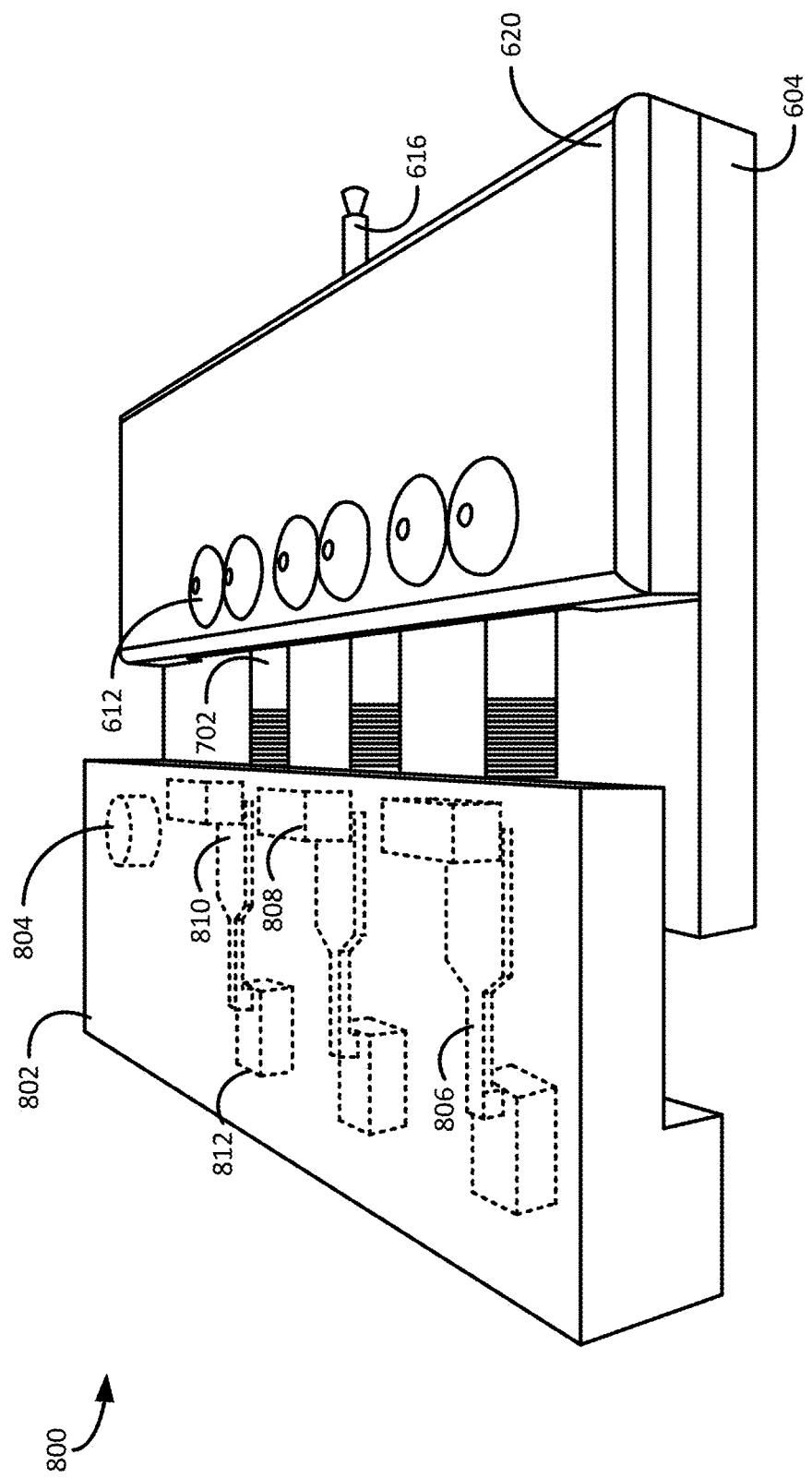
FIG. 8 is an exploded, perspective view of the base unit and sensor cartridge for ES measurement of a sample within the sensor cartridge.

FIG. 8 illustrates the disposable sensor cartridge 802 interfacing with base unit 600 for conducting an ES measurement of a sample medium included in the cartridge. In general, the sensor cartridge 802 is a disposable unit that attaches to or otherwise interacts with the base unit 600 to complete a given diagnostic task. The sensor cartridge 802 includes one or more microfluidic channels 806 that guide both the calibration detection buffer, washing buffer, and patient samples towards the sensor surface. Each sample channel 806 includes a calibration media reservoir 808 and a patient sample reservoir 810 connected to a Y-shaped microfluidic channel over the electrode surface 702 when the sensor cartridge 802 is connected or seated with the base unit 600. The patient sample reservoir is connected to a sample inlet 804. A sample, such as a drop of blood of the patient, may be placed within the sample inlet 804 for dispersing to the patient sample reservoirs 810 of the channels. The Y-shaped channel 806 allows for a calibration step to be performed prior to the actual diagnostic step on the patient samples. A waste reservoir 812 is located at the opposite end of the channel 806 of the calibration media reservoir 808 for collection of the calibration detection buffer, washing buffer, and patient samples. Addition analysis may be used to provide accurate quantification of patient antibody levels and to account for non-specific biases arising from the sample matrix. The level of antibody for calibration is far less than the level needed to saturate the binding sites on the electrodes 702 with the antibody. The calibration step includes two calibration detection buffer and washing cycles released sequentially from blister packs within the calibration reservoirs 808 to facilitate calibration using standard addition.

In one particular implementation, the electrode sensing chips 702 may be single or multi-electrode sensing chips constructed from gold on glass substrate. A chromium layer may first be deposited as an adhesive layer at 50 nm thickness, followed by a gold layer of 150 nm. Polydimethylsiloxane (PDMS) may be used to create a well on top of each sensor site 610. The PDMS wells may be plasma-treated to create permanent bind to the glass substrate. Surface preparation of gold electrodes includes probe/SAM layer immobilization with electrodes connecting to the signal acquisition channel through a flat flexible cable.

Figure 9:
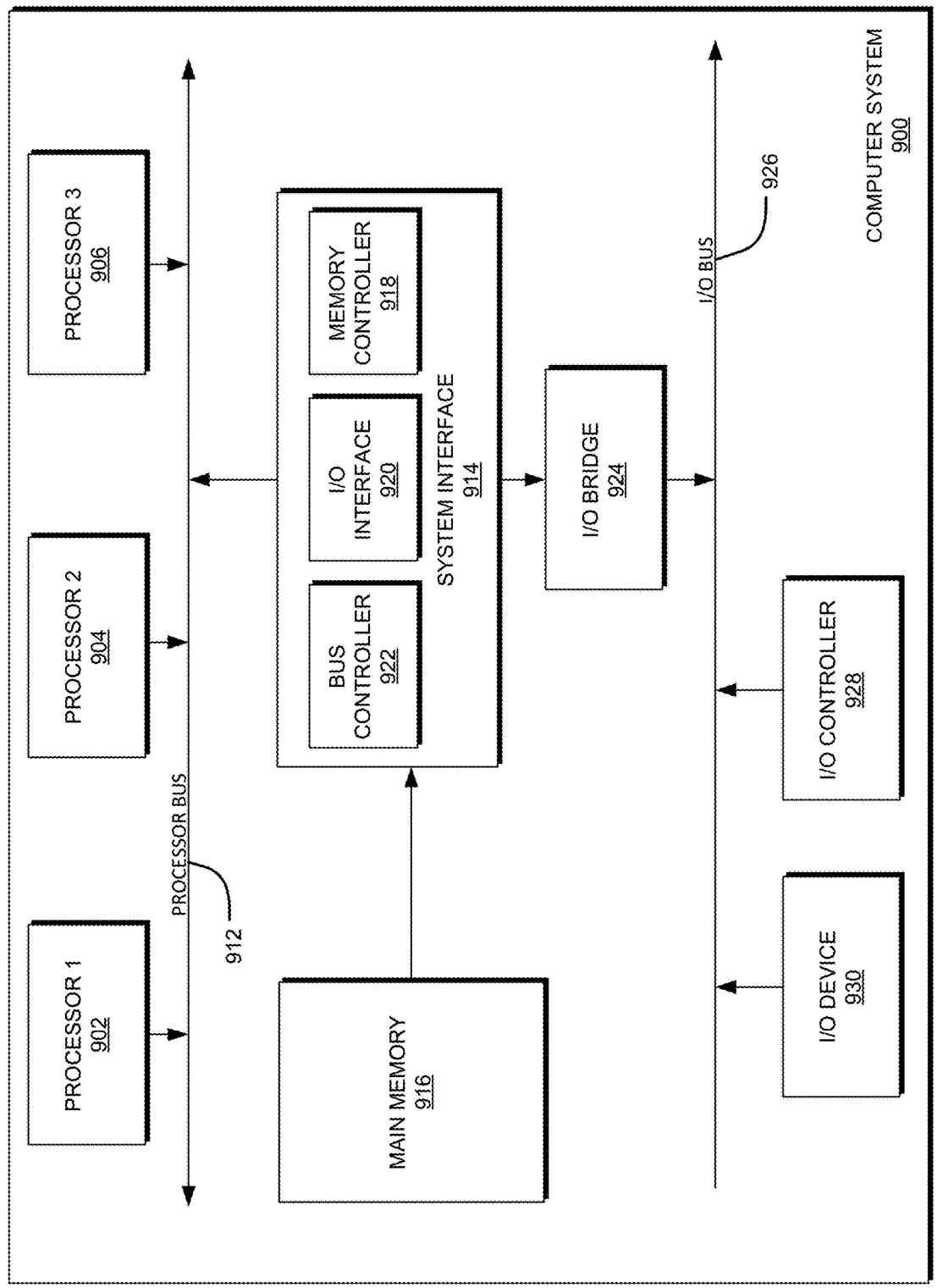
FIG. 9 is a diagram illustrating an example of a computing system which may be used in implementing embodiments of the present disclosure.

To conduct the ES analysis of a sample, a user of the sensing system 100 inserts or connects the base unit 104 to the computing device 102. FIG. 9 is a block diagram illustrating an example computing device 102 which may be used in implementing the embodiments of the components of the network disclosed above. The computing system (system) includes one or more processors 902-906. Processors 902-906 may include one or more internal levels of cache (not shown) and a bus controller or bus interface unit to direct interaction with the processor bus 912. Processor bus 912, also known as the host bus or the front side bus, may be used to couple the processors 902-906 with the system interface 914. System interface 914 may be connected to the processor bus 912 to interface other components of the system 900 with the processor bus 912. For example, system interface 914 may include a memory controller 918 for interfacing a main memory 916 with the processor bus 912. The main memory 916 typically includes one or more memory cards and a control circuit (not shown). System interface 914 may also include an input/output (I/O) interface 920 to interface one or more I/O bridges or I/O devices with the processor bus 912 through an I/O bridge 924. One or more I/O controllers and/or I/O devices may be connected with the I/O bus 926, such as I/O controller 928 and I/O device 930, as illustrated.

I/O device 930 may also include an input device (not shown), such as an alphanumeric input device, including alphanumeric and other keys for communicating information and/or command selections to the processors 902-906. Another type of user input device includes cursor control, such as a mouse, a trackball, or cursor direction keys for communicating direction information and command selections to the processors 902-906 and for controlling cursor movement on a display device 932 associated with the computing device.

System 900 may include a dynamic storage device, referred to as main memory 916, or a random access memory (RAM) or other computer-readable devices coupled to the processor bus 912 for storing information and instructions to be executed by the processors 902-906. Main memory 916 also may be used for storing temporary variables or other intermediate information during execution of instructions by the processors 902-906. System 900 may include a read only memory (ROM) and/or other static storage device coupled to the processor bus 912 for storing static information and instructions for the processors 902-906. The system set forth in FIG. 9 is but one possible example of a computer system that may employ or be configured in accordance with aspects of the present disclosure.

According to one embodiment, the above techniques may be performed by computer system 900 in response to processors 902-906 executing one or more sequences of one or more instructions contained in main memory 916. These instructions may be read into main memory 916 from another machine-readable medium, such as a storage device. Execution of the sequences of instructions contained in main memory 916 may cause processors 902-906 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 916. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

A typical operating sequence for conducting ES analysis through the detection system 100 includes a user connecting the base unit 104 to the computing device 102. This connection may include physically inserting a wired connection into the computing device or wirelessly connecting to the device. In one particular embodiment, the user may utilize the computing device 102 to connect to the base unit 104 through Bluetooth® technology or any other known or hereafter developed wireless communication protocol. Once connected, the user may insert one or more electrode chips 702 for a target pathogen into the electrode chip positions 610 of the bottom layer 602 of the base unit 600. Different electrode chips 702 may be inserted for detection of different types of pathogens through the ES measurement. The user may further adjust the electrode connections 608 through the one or more sensor electrode position adjusters 612 to ensure that connections between the electrode chips 702 and the electrochemical sensing and processing board 602 are made.

Next, the user may attach the disposable sensor cartridge 802 to the base unit 604 and begin a calibration step by activating two calibration buffer and washing cycles. In one particular embodiment, the calibration step may be performed in response to an instruction received at the base unit 604 from the computing device 102. Finally, the user may provide a patient sample to the sample inlet 804 to start the diagnostic ES analysis. ES data results and other information may be provided to the computing device 102 as described above from the electrochemical sensing and processing circuit board 602 upon completion of the ES analysis. In this manner, the sensing device 100 may be utilized to perform a compact, low-power ES analysis of a sample.

Figure 10:
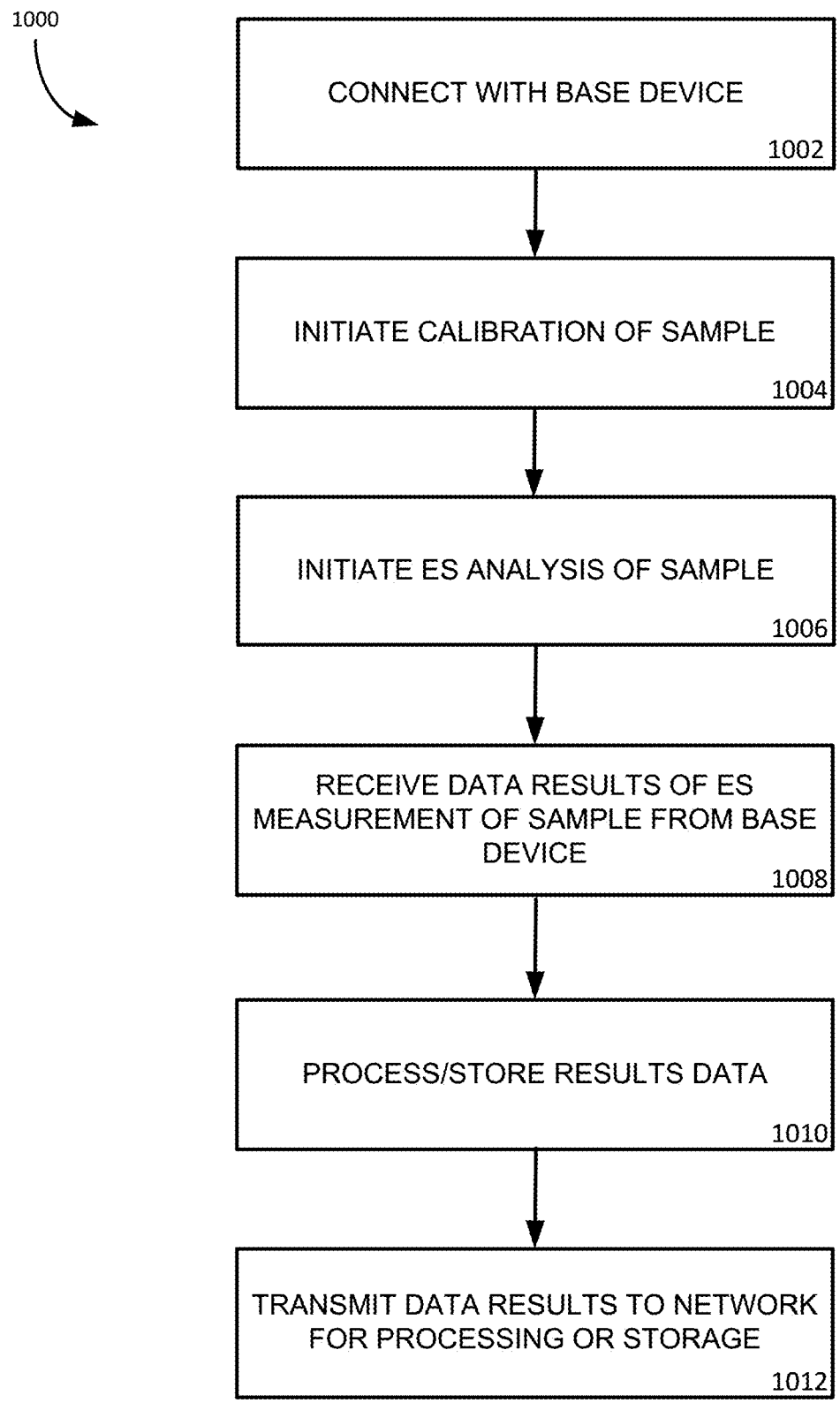
FIG. 10 is a flowchart of a method for utilizing an application of an ES system to conduct an ES analysis of a sample.

As described above, the computing device 102 portion of the ES system 100 may include an application 108 that is executed by the computing device to provide a user interface to a user of the system. Through the application 108, a user may control aspects of the ES procedure for a patient sample. Thus, the application 108 may provide a user interface (such as a graphical user interface (GUI)) through which the user may provide inputs or instructions and receive information from the base unit 104. FIG. 10 is a flowchart of a method 1000 for utilizing the application 108 to conduct an ES analysis of a sample. It should be appreciated that the operations of the method 1000 are simple examples of the features provided by the application 108 in relation to the system 100. Various other features may also be provided through the application 108 as it relates to the portable nature of the ES system.

Beginning in operation 1002, the application 108 connects to the base unit 104 to exchange communications. This operation may include configuring one or more communication ports to exchange communication packets between the computing device 102 and the base unit 104. Once communication has been achieved between the devices, the EIS application 108 may initiate a calibration procedure within the base unit 104 to calibrate the electrode chips 702 for a particular ES analysis in operation 1004. In one particular embodiment, the application 108 may receive one or more instructions through the GUI from a user of the system 100 to initiate the calibration of the base unit 104. This provides the user time to insert the proper electrodes 702 into the base 104 before calibration begins. The initiation of the calibration process may include generating one or more instructions for the controller 118 of the base unit 104 and transmitting those instructions to the base unit through the communication pathway between the devices. The controller 118 may, in turn, execute those instructions to begin the calibration procedure of the electrodes 702.

At some later time, the application 108 may initiate the ES analysis or procedure, in operation 1006. Similar to the calibration procedure, this procedure may begin upon receiving an input from a user of the computing device 102 or may begin automatically. In instances where the application 108 automatically initiates the ES analysis, one or more indicators from the base unit 104 may be received over the communication pathway to indicate that the sample was calibrated properly through a calibration procedure prior to the ES procedure. In operation 1008, the application 108 receives the results data from the base unit 104 over the communication path.

In operation 1010, the computing device 102 may process and/or store the received ES results data. Processing of the data may include any type of analysis of the results for use by the computing device 102 or a user of the computing device. For example, the presence of anomalies in the sample may be detected through the analysis and provided to the user through the GUI of the application 108. The results data may also be stored in one or more memory devices for use by the computing device 102 at a later time. Further, in operation 1012, the computing device 102 may transmit all or some of the result data to a network device included in the network 114. The transmission of the data may be conducted in response to an input received at the application 108 from the user of the device. In the above manner, the application 108 may coordinate aspects of the ES analysis of the sample, either directly or in response to one or more inputs provided to the application by the user of the system 100.

As discussed, the ES result data may be provided to a network 114 and, more particularly, to one or more servers of the network. The servers of the network 114 may thus correlate, combine, analyze, and process data results from multiple such ES systems 100. For example, the computing device 102 may be equipped with a Global Positioning System (GPS) that provides a geographic location of the computing device. This information may be included in the data results transmitted to the network 114 by the computing device 102 such that an estimated geographic position at which the sample was collected and processed may be obtained by the server. As such data may be obtained from several such systems 100, a rich geographical information base may be collected to enable epidemiological modeling for forecasting and monitoring disease outbreaks in real time. The collection of information may utilize classification using meta-algorithmics to improve classification accuracy and system analysis behavior. Additional analytics may include data analysis to assess the ES system's 100 diagnostic outcome may include packaged data transmitted to the cloud server for centralized processing.

By providing a mobile ES diagnostic system 100, testing may be done in almost any location, such as a patient's home or physician's office. Such information may be rapidly transmitted to a cloud-based data system for accurate and near real-time surveillance. Aggregated results allow for algorithms to rapidly flag increases in specific diseases thereby providing an early warning detection system for infectious disease outbreaks. Further, non-invasive, multiplex, at-home testing can increase testing rates and case ascertainment. In many instances, data results may be encrypted or otherwise protected from identifying a particular patient or user of the system 100.

Figure 11:
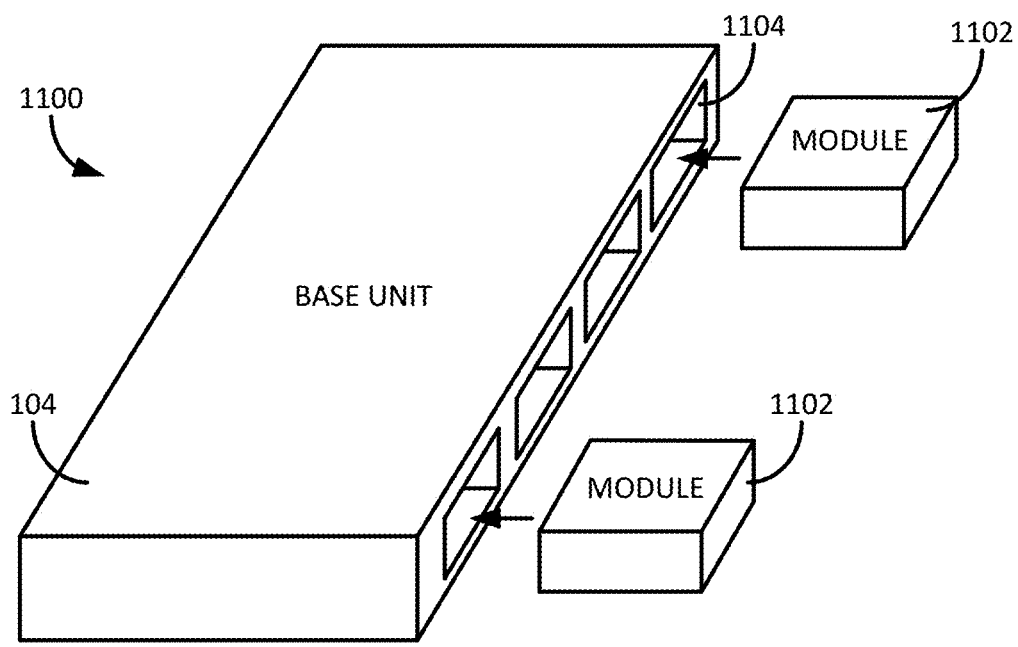
FIG. 11 illustrates an alternative embodiment of the base unit of the ES system that includes interfaces for one or more modules.

As discussed above, the ES system 100 may include modules or have other modularity features such that a user of the system may configure the ES system for particular types of ES analysis. For example, FIG. 11 illustrates an alternative embodiment of the base unit 104 of the ES system that includes interfaces 1104 for one or more modules 1102. In general, the modules 1102 include electrical components that provide additional functionality to the base unit 104 of the system 100. A user of the system 100 may purchase and/or insert the modules 1102 into one or more respective interfaces 1104 of the base unit 104 to add the functionality of the module. In this manner, a user may customize the ES system 100 for particular capabilities as desired, either for particular use cases or for financial reasons. Although not shown, the interface 1104 may include any number of connectors that interact or contact respective connectors of the module 1102 to electrically connect the components of the modules to the other components of the base device 104. Several examples of the functionality that may be added to the ES system 100 are now presented through the use of the function modules 1102.

Figure 12:
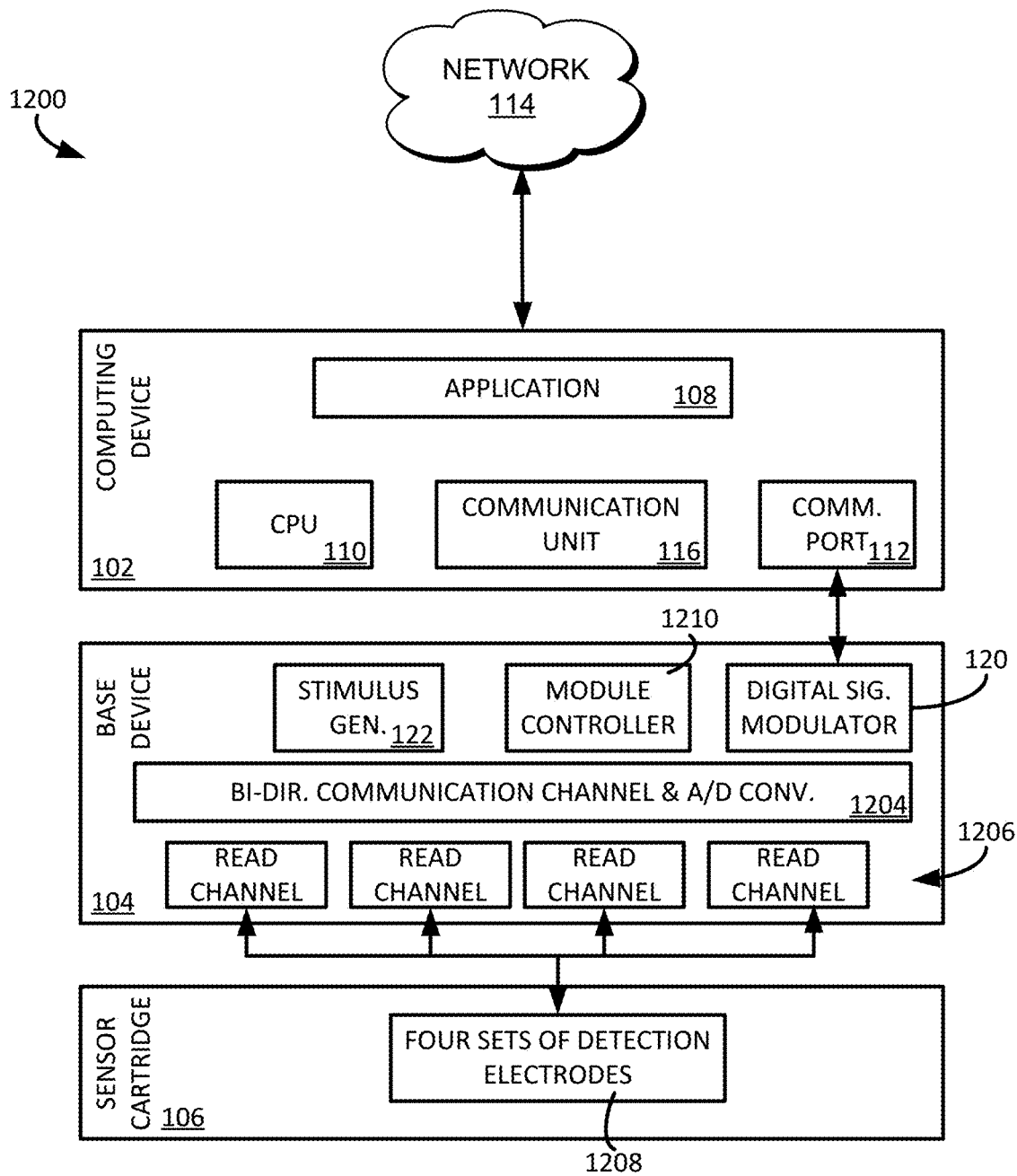
FIG. 12 is a diagram illustrating the inclusion of a quad-channel expansion module in the base unit of the ES system.

FIG. 12 is a diagram illustrating the inclusion of a quad-channel expansion module in the base unit 104 of the ES system 100. In general, the components of the expanded system 1200 illustrated in FIG. 12 may be similar to those described above with relation to FIG. 1 (and in other places throughout). For example, the expanded system 1200 may include a computing device 102 that includes an application 108, CPU 110, communication unit 116, and a communication port 112. The computing device 102 may also operate as described above through communications with the network 114 and the base device 104. In addition, the base unit 104 may include similar components as described above, such as the stimulus generator 122, controller 118, and digital signal modulator 120. Other components may be included with both the computing device 102 and the base unit 104 that are not shown or discussed further, such as the clock generator 124 circuit. In addition to those components discussed above, the expanded system 1200 may include a module 1102 that is inserted into a module interface 1104 that provides the system with quad-channel communication between the base unit 104 and the sensor cartridge 106. In one particular embodiment, the module may include its own module controller 1210 that interacts with the base unit controller 118 through the exchange of instructions and/or data. The module controller 1210 and the base unit controller 118 may operate in tandem to control the operations of the inserted module to the system 100.

Through the insertion of the quad-channel module, a bi-directional communication channel and analog-to-digital converter 1204 of the module may be in communication with the components of the circuit of the base unit 104. For example, the bi-directional communication channel 1204 may communicate with one or more of the other components of the base unit 104. In addition, four read channels 1206 may be provided within the module to provide the quad-channel communication between the base unit 104 and the sensor cartridge 106. In one embodiment, the four read channels 1206 may be controlled by the controller 118 to coordinate reading four inputs from the read-channels simultaneously and pass the data in a time-multiplexed fashion to the A/D converter. The start and stop time for each read-channel can be independently controlled by the controller 118. To utilize the quad-channel communication provided through the module, the system 1200 may utilize a sensor cartridge 106 that includes four sets of electrodes for ES detection such that the four electrodes connect to the four read channels 1206. This quad-channel communication module provides for faster read results for the system 1200 while increasing the number of ES analysis procedures that may occur at one time.

Figure 13:
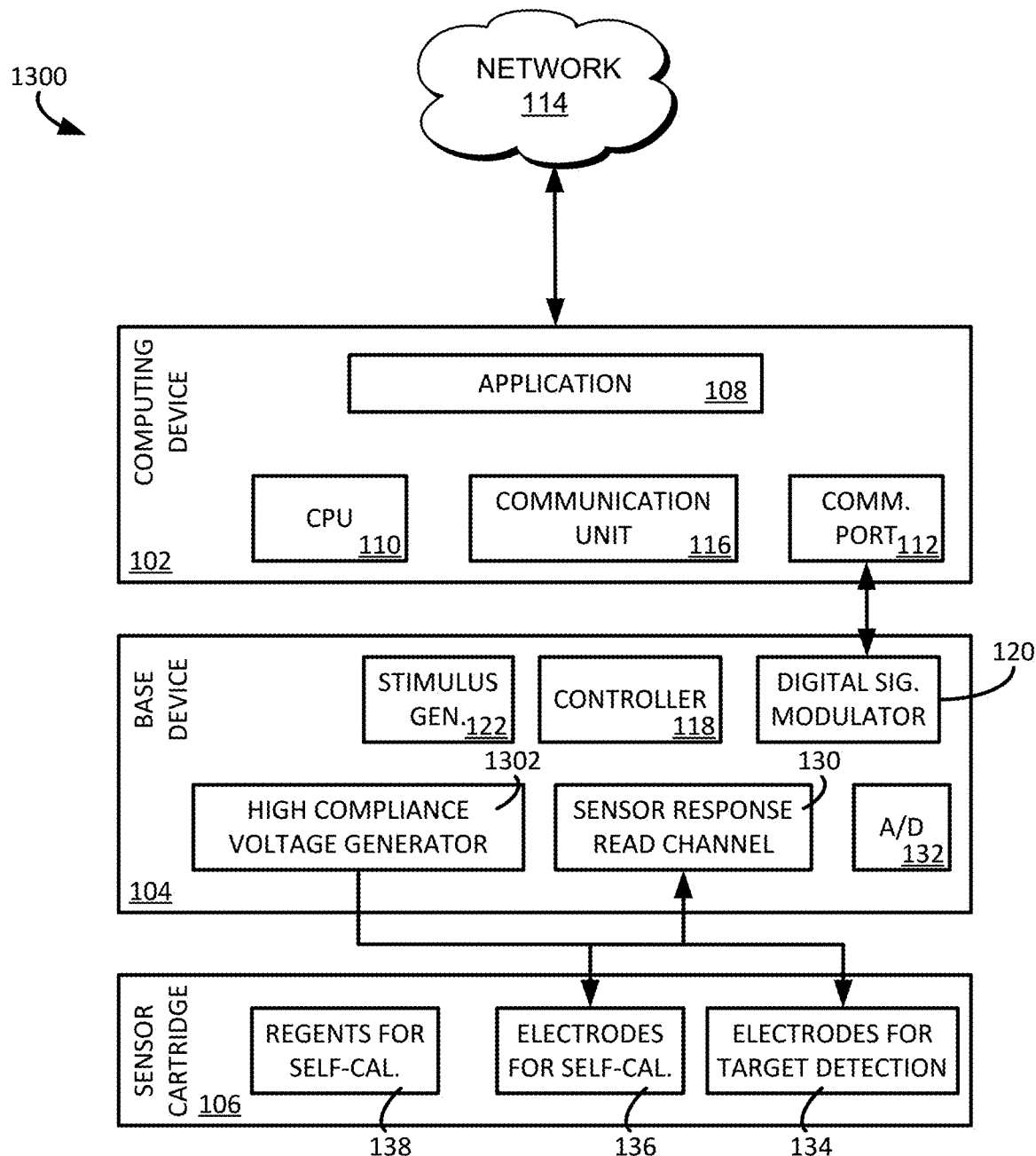
FIG. 13 is a diagram illustrating the inclusion of a high-compliance voltage expansion module in the base unit of the ES system.

In another example, FIG. 13 is a diagram illustrating the inclusion of a high-compliance voltage expansion module in the base unit 104 of the ES system 100. The addition of the module may be provided in a similar manner as described above, such as through the insertion of a module 1102 containing high-compliance voltage expansion circuits into an interface 1104 of the base unit 104 of the system 100. The high-compliance voltage expansion circuits may include a high-compliance voltage generator 1302 in communication with components of the base unit 104 and/or the sensor cartridge 106. In one particular embodiment of the base unit 104, the compliance voltage may be set at 6 volts total. However, through the high-compliance voltage expansion module, this compliance voltage may be expanded. The system 1300 may utilize different modules depending on which level of compliance voltage the user of the system intends. The speed and noise specifications of the high-compliance voltage expansion may be the same as those of the base unit 104. However, the high-compliance voltage expansion module may have its own potentiostat that meets the compliance voltage requirement of the system 1300. The stimulus signal from the base unit 104 may be further processed by the high-compliance voltage expansion module's potentiostat before being applied to the electrodes 134 of the sensor cartridge 106.

Figure 14:
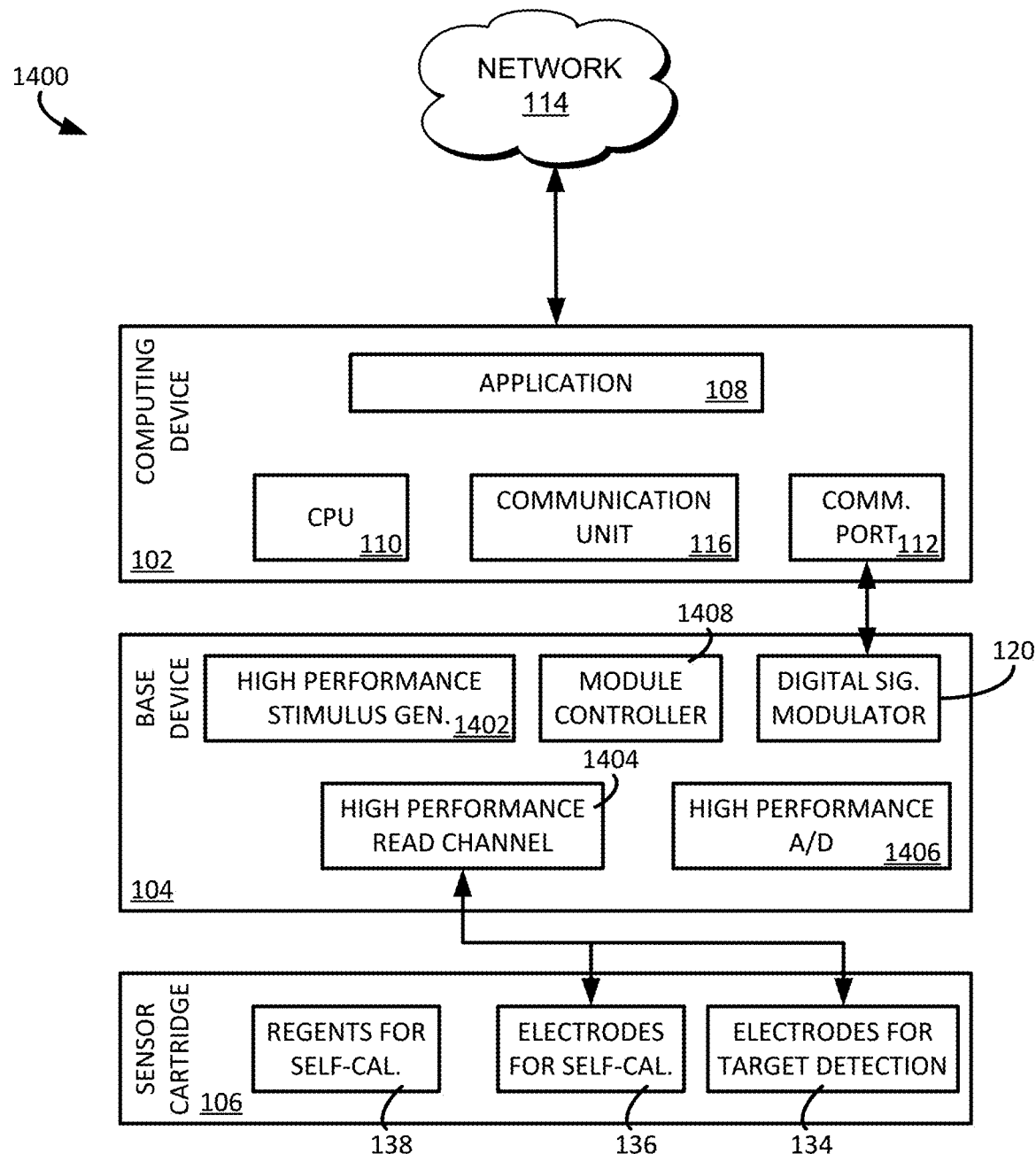
FIG. 14 is a diagram illustrating the inclusion of a high-speed module in the base unit of the ES system.

In yet another example of the potential modular feature available through the system 100, FIG. 14 is a diagram illustrating the inclusion of a high-speed module in the base unit 104 of the ES system 100. The addition of the module may be provided in a similar manner as described above, such as through the insertion of a module 1102 containing high-speed circuits into an interface 1104 of the base unit 104 of the system 100. The high-speed circuits of the module may include a high-performance stimulus generator 1402, a high-performance read channel 1404, and/or a high performance A/D converter 1406. In general, the speed requirements of the system 100 may be related to two modes of operations: scan rate of cyclic voltammetry; and frequency of stimulus for EIS. Through the high-performance stimulus generator 1402, read-channel 1404, and A/D unit 1406, the functionality of communication to the computing device 102 is shared with the base unit 104. The base unit module controller 1408 may coordinate with the central controller 118 in the base unit 104 to perform specific measurements with a given speed requirement. Similar to that of the high-compliance voltage module discussed above, the high-performance module can be further divided into different modules based on the performance. For example, the module can be further differentiated into different modules based on the output current resolution requirement as well as the bias current requirements for the reference electrode and for the working electrode. For example, a typical frequency range for EIS analysis is from 1 Hz to 10 kHz. The high-speed module can further expand the frequency range to MHz, if desired.

Figure 15:
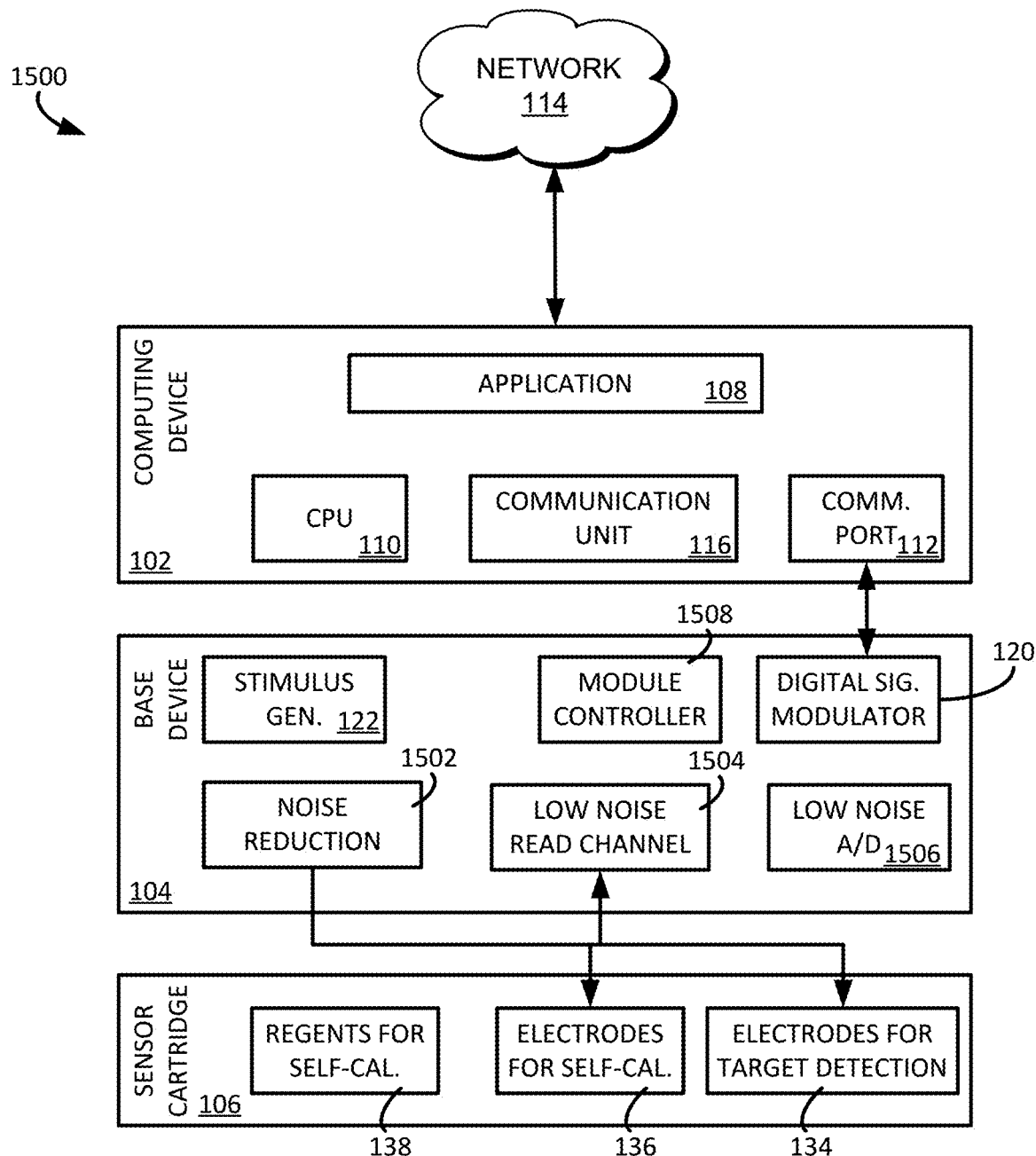
FIG. 15 is a diagram illustrating the inclusion of a low-noise module in the base unit of the ES system.

In yet another example of the potential modular feature available through the system 100, FIG. 15 is a diagram illustrating the inclusion of a low-noise module in the base unit 104 of the ES system 100. The addition of the module may be provided in a similar manner as described above, such as through the insertion of a module containing low-noise circuits into an interface 1104 of the base unit 104 of the system 100. The low-noise circuits of the module may include a noise reduction circuit 1502, a low-noise read channel 1504, and/or a low-noise A/D converter 1506. For highly sensitive ES measurements, the limit of detection of the measurement instrument may be lowered. In general, the majority of the instrument noise in ES systems is provided by two components in the module: the read-channel circuit and the A/D and D/A converters. Through the low-noise module, low-noise components may be added to the base unit 104 to reduce the noise provided in the data results. In addition to choosing low-noise components for the read-channel and the A/D and D/A converters for this module, the module may also include active noise reduction circuit using techniques such as correlated double sampling or chopper stabilization to further reduce noise in the read-channel.

Figure 16:
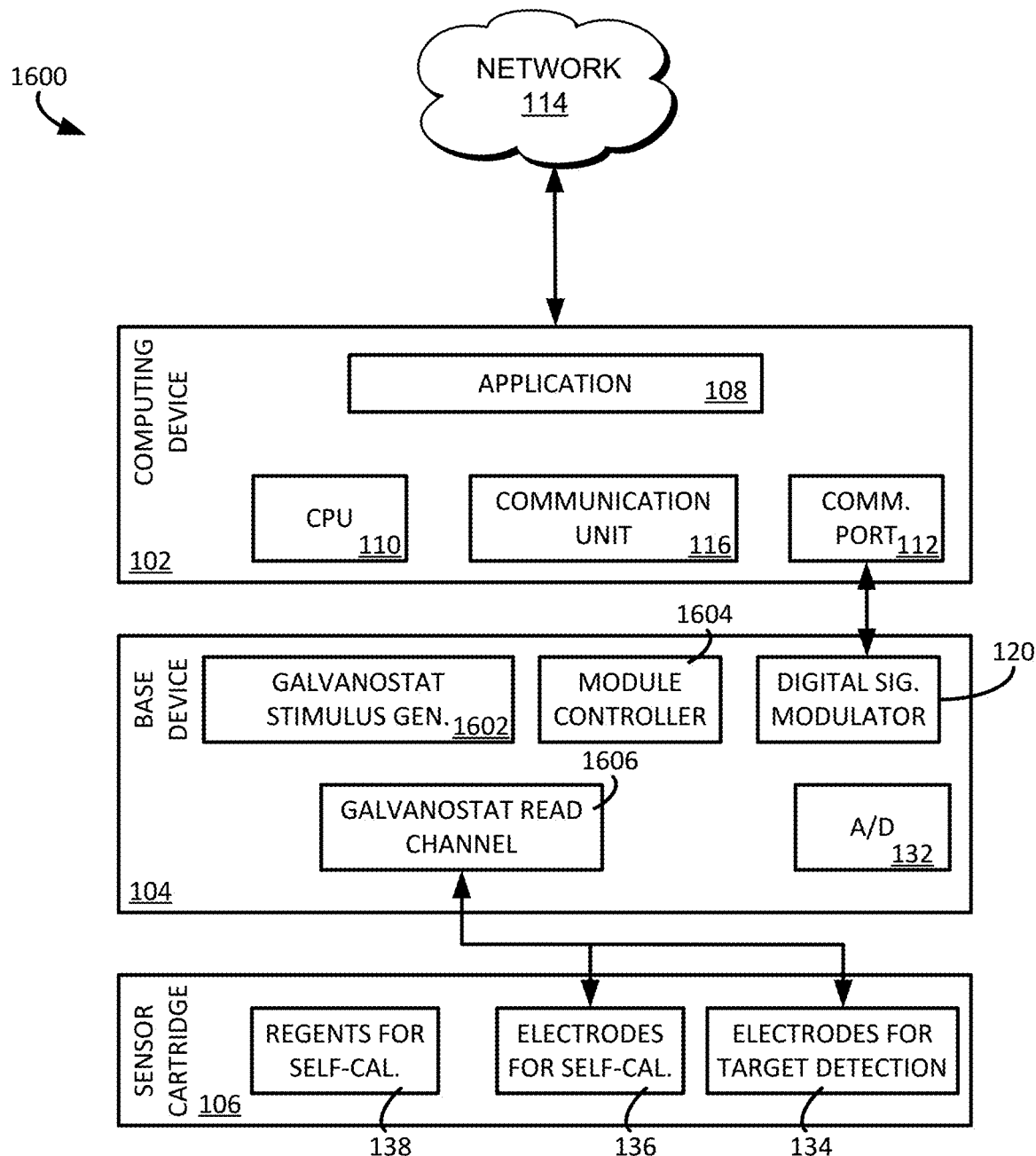
FIG. 16 is a diagram illustrating the inclusion of a galvanostat module in the base unit of the ES system.

In still yet another example of the potential modular feature available through the system 100, FIG. 16 is a diagram illustrating the inclusion of a galvanostat module in the base unit 104 of the ES system 100. The addition of the module may be provided in a similar manner as described above, such as through the insertion of a module containing galvanostat circuits into an interface 1104 of the base unit 104 of the system 100. The galvanostat circuits of the module may include a galvanostat stimulus signal generator 1602, a galvanostat read channel 1606, and/or a module controller 1604. A user may plug in the galvanostat module to perform galvanometry on a sample through the ES device 100. The main difference between the galvanostat module and the base unit 104 is the galvanostat-specific stimulus generator 1602 when performing galvanometry and the galvanostat read-channel 1606 for monitoring constant current during the measurement. The module controller 1604 works with the central controller 118 in the base unit 104 to perform the galvanostat functions.

It should be appreciated that one or more of the above modules, or any modules for use with the ES system 100, may be utilized together in the base unit 104. For example, two quad-channel communication modules may be inserted into the base unit 104 to measure the data results on 8 channels simultaneously. In another example, a user may insert a quad-channel and a high-compliance module into the base unit 104 to perform measurement with four channels, with each channel having a significantly higher compliance voltage than a typical base unit 104. In this manner, the functionality of the ES system 100 may be further customized through the insertion of more than one performance module into the base unit. Further, although several examples of modules are described herein, it should be appreciated that any type of module for increasing the functionality of the ES system 100 may be included and attached to the base unit 104. For example, the galvanostat module may be included with the high-performance module to further improve the galvanostat measurements of the sample. In this manner, a user of the system 100 may customize the functionality and cost of the device as needed.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. An electrochemical sensing device comprising:
   an expansion module;
   a base device comprising:
      a base unit controller circuit;
      a stimulus signal generation portion comprising a
        stimulus signal generator circuit in communication with the base unit controller circuit, the stimulus signal generator circuit for generating a stimulus signal for conducting electrochemical analyses of samples;

a data acquisition portion comprising a response read channel for receiving data results for the electrochemical analyses; and an expansion interface comprising an external expansion slot, the expansion interface configured to removably receive an expansion module in the expansion slot, wherein, without the expansion module disposed within the expansion interface, the base device is configured to receive a first sensor cartridge such that the data acquisition portion is configured to communicate with the first sensor cartridge using the response read channel; and wherein, when the expansion module is received by the expansion interface, the base device and the expansion module are configured to receive a second sensor cartridge such that the data acquisition portion is configured to communicate with the second sensor cartridge over multiple channels.

2. The electrochemical sensing device of claim 1 wherein the base device further comprises a communication unit for communicating with a computing device, the computing device comprising a communication port and a central processing unit.

3. The electrochemical sensing device of claim 2 wherein the computing device further comprises a display device and the central processing unit executes a user application to display a graphical user interface on a display device.

4. The electrochemical sensing device of claim 2 wherein the computing device receives at least a portion of the data results for the electrochemical analysis of the samples through the communication port.

5. The electrochemical sensing device of claim 4 wherein the computing device transmits the portion of the data results to a networking device of a network, the networking device correlating data results from a plurality of electrochemical analyses of a plurality of samples.

6. The electrochemical sensing device of claim 1 wherein the stimulus signal comprises a composite signal comprised of a plurality of sinusoidal signals, each sinusoidal signal of the plurality of sinusoidal signals having a different frequency and corresponding to a respective stimulus to be applied to the samples.

7. The electrochemical sensing device of claim 1, wherein the expansion module enables quad-channel communication between the base device and the second sensor cartridge.

8. The electrochemical sensing device of claim 1, wherein the expansion module includes a bi-directional communication channel such that, when the expansion module is received by the expansion interface, the expansion module communicates with the base device over the bi-directional communication channel.

9. The electrochemical sensing device of claim 1, wherein the expansion module includes an analog-to-digital converter.

10. The electrochemical sensing device of claim 1, wherein the base unit controller circuit is configured to coordinate reading data from the multiple channels when the expansion module is received by the expansion interface.

11. The electrochemical sensing device of claim 1, wherein the base unit controller circuit is configured to coordinate simultaneous reading from the multiple channels and to pass data received simultaneously from the multiple channels to an analog-to-digital converted in a time-multiplexed fashion.

12. The electrochemical sensing device of claim 1, wherein the expansion interface is configured to receive a second expansion module to modify at least one of a stimulation process and a read process provided by the base device absent the second expansion module.

13. A method for analyzing a sample, the method comprising: connecting a computing device with a base unit, the base unit including:

a base unit controller circuit;

a stimulus signal generation portion including a stimulus signal generator circuit in communication with the base unit controller circuit, the stimulus signal generator circuit for generating a stimulus signal for conducting electrochemical analysis of the samples;

a data acquisition portion comprising a response read channel for receiving data results for the electrochemical analysis; and an expansion interface comprising an external expansion slot and a module controller, the expansion interface configured to removably receive an expansion module in the expansion slot, wherein, without the expansion module disposed within the expansion interface, the base device is configured to receive a first sensor cartridge such that the data acquisition portion is configured to communicate with the first sensor cartridge using the response read channel;

inserting the expansion module into the expansion interface, mating a second sensor cartridge with the expansion module, wherein, when the expansion module is received by the expansion interface, the base device and the expansion module are configured to receive a second sensor cartridge such that the data acquisition portion is configured to communicate with the second sensor cartridge over multiple channels, transmitting the stimulus signal for conducting the electrochemical analysis of the sample to the second sensor cartridge; and receiving electrochemical results data for the electrochemical analysis of the sample from the second sensor cartridge through the expansion module.

14. The method of claim 13 further comprising transmitting a calibration signal to the base unit from the computing device in response to a calibration input received at the computing device from a user interface.

15. The method of claim 13 further comprising transmitting the electrochemical results data for the electrochemical analysis to a network device of a network, the network device correlating data results from a plurality of electrochemical analysis of a plurality of samples.

16. The method of claim 13, wherein receiving the electrochemical results data comprises coordinating simultaneous reading from the multiple channels using the base unit controller circuit.

17. The method of claim 13, wherein receiving the electrochemical results data comprises coordinating simultaneous reading from the multiple channels using the base unit controller circuit and passing data received simultaneously from the multiple channels to an analog-to-digital converted in a time-multiplexed fashion using the base unit controller circuit.

18. The method of claim 13, wherein the expansion module enables quad-channel communication between the base unit and the second sensor cartridge when received by the expansion interface.

19. The method of claim 13, wherein the expansion module includes a bi-directional communication channel such that, when the expansion module is received by the expansion interface, the expansion module communicates with the base unit over the bi-directional communication channel.

* * * * *